United States Patent
Brezina et al.

(10) Patent No.: US 9,954,963 B2
(45) Date of Patent: Apr. 24, 2018

(54) INDEXING AND SEARCHING CONTENT BEHIND LINKS PRESENTED IN A COMMUNICATION

(71) Applicant: YAHOO HOLDINGS, INC., Sunnyvale, CA (US)

(72) Inventors: Matthew Brezina, San Francisco, CA (US); Adam Smith, San Francisco, CA (US)

(73) Assignee: OATH INC., New York, NY (US)

( * ) Notice: Subject to any disclaimer, the term of this patent is extended or adjusted under 35 U.S.C. 154(b) by 0 days.

(21) Appl. No.: 14/739,370

(22) Filed: Jun. 15, 2015

(65) Prior Publication Data

US 2016/0070787 A1  Mar. 10, 2016

Related U.S. Application Data

(63) Continuation of application No. 14/224,446, filed on Mar. 25, 2014, now Pat. No. 9,058,366, which is a
(Continued)

(51) Int. Cl.
  *G06F 17/30* (2006.01)
  *H04L 29/08* (2006.01)
  (Continued)

(52) U.S. Cl.
  CPC .......... *H04L 67/22* (2013.01); *G06F 3/0481* (2013.01); *G06F 3/0484* (2013.01); *G06F 3/04842* (2013.01); *G06F 17/2247* (2013.01); *G06F 17/30554* (2013.01); *G06F 17/30722* (2013.01); *G06F 17/30905* (2013.01); *H04L 51/046* (2013.01); *H04L 51/16* (2013.01); *H04L 51/36* (2013.01); *H04L 67/306* (2013.01);
(Continued)

(58) Field of Classification Search
  CPC ...................................................... H04L 67/306
  USPC .................................................. 707/22, 738
  See application file for complete search history.

(56) References Cited

U.S. PATENT DOCUMENTS 5,396,647 A  3/1995 Thompson et al.
5,610,915 A  3/1997 Elliott et al.
(Continued)

FOREIGN PATENT DOCUMENTS

CN  1013518118  1/2009
EP  0944002  9/1999
(Continued)

OTHER PUBLICATIONS

European Patent Application 12801998.1, Extended Search Report, dated Feb. 10, 2015.
(Continued)

*Primary Examiner* — Baoquoc N To
(74) *Attorney, Agent, or Firm* — James J. DeCarlo; Greenberg Traurig, LLP

(57) ABSTRACT

Among other disclosures, a method may include identifying content in an electronic communication, the content including a link. The method may include characterizing content associated with the link and storing the characterization. Upon detecting a match of a characterization, presenting one or more of the communication or portion thereof, the link or content associated with the link.

19 Claims, 8 Drawing Sheets

Related U.S. Application Data continuation of application No. 12/180,503, filed on Jul. 25, 2008, now Pat. No. 8,745,060.

(60) Provisional application No. 60/951,880, filed on Jul. 25, 2007.

(51) Int. Cl.

| | | |
|---|---|---|
| G06F 3/0484 | (2013.01) | |
| G06F 3/0481 | (2013.01) | |
| H04M 15/00 | (2006.01) | |
| H04W 24/08 | (2009.01) | |
| G06F 17/22 | (2006.01) | |
| H04L 12/58 | (2006.01) | |
| G06F 3/048 | (2013.01) | |

(52) U.S. Cl.
CPC ............ *H04M 15/00* (2013.01); *H04M 15/43* (2013.01); *H04M 15/44* (2013.01); *H04M 15/58* (2013.01); *H04M 15/745* (2013.01); *H04W 24/08* (2013.01); *G06F 3/048* (2013.01); *H04M 2215/0104* (2013.01); *H04M 2215/0108* (2013.01); *H04M 2215/0188* (2013.01)

(56) References Cited

U.S. PATENT DOCUMENTS

| | | |
|---|---|---|
| 5,966,714 A | 10/1999 | Huang et al. |
| 6,020,884 A | 2/2000 | MacNaughton et al. |
| 6,154,205 A | 11/2000 | Carroll et al. |
| 6,285,999 B1 | 9/2001 | Page |
| 6,321,187 B1 | 11/2001 | Squier et al. |
| 6,385,644 B1 | 5/2002 | Devine et al. |
| 6,405,197 B2 | 6/2002 | Gilmour |
| 6,484,196 B1 | 11/2002 | Maurille |
| 6,502,131 B1 | 12/2002 | Vaid et al. |
| 6,510,453 B1 | 1/2003 | Apfel et al. |
| 6,546,393 B1 | 4/2003 | Khan |
| 6,560,620 B1 | 5/2003 | Ching |
| 6,594,654 B1 | 7/2003 | Salam et al. |
| 6,606,744 B1 | 8/2003 | Mikurak |
| 6,615,348 B1 | 9/2003 | Gibbs |
| 6,714,967 B1 | 3/2004 | Horvitz |
| 6,721,748 B1 | 4/2004 | Knight et al. |
| 6,816,850 B2 | 11/2004 | Culliss |
| 6,832,245 B1 | 12/2004 | Isaacs et al. |
| 6,931,419 B1 | 8/2005 | Lindquist |
| 6,952,805 B1 | 10/2005 | Tafoya et al. |
| 6,965,918 B1 | 11/2005 | Arnold et al. |
| 6,996,777 B2 | 2/2006 | Hiipakka |
| 7,003,724 B2 | 2/2006 | Newman |
| 7,058,892 B1 | 6/2006 | MacNaughton et al. |
| 7,076,533 B1 | 7/2006 | Knox et al. |
| 7,085,745 B2 | 8/2006 | Klug |
| 7,103,806 B1 | 9/2006 | Horvitz |
| 7,149,985 B1 | 12/2006 | Crosby et al. |
| 7,181,518 B1 | 2/2007 | Matsumoto et al. |
| 7,185,065 B1 | 2/2007 | Holtzman et al. |
| 7,237,009 B1 | 6/2007 | Fung et al. |
| 7,246,045 B1 | 7/2007 | Rappaport et al. |
| 7,289,614 B1 | 10/2007 | Twerdahl et al. |
| 7,328,242 B1 | 2/2008 | McCarthy et al. |
| 7,333,976 B1 | 2/2008 | Auerbach et al. |
| 7,359,894 B1 | 4/2008 | Liebman et al. |
| 7,383,307 B2 | 6/2008 | Kirkland et al. |
| 7,444,323 B2 | 10/2008 | Martinez et al. |
| 7,454,464 B2 | 11/2008 | Puthenkulam et al. |
| 7,475,109 B1 | 1/2009 | Fletcher et al. |
| 7,475,113 B2 | 1/2009 | Stolze |
| 7,478,361 B2 | 1/2009 | Peteanu et al. |
| 7,512,788 B2 | 3/2009 | Choi et al. |
| 7,512,814 B2 | 3/2009 | Chen et al. |
| 7,536,384 B2 | 5/2009 | Venkataraman et al. |
| 7,539,676 B2 | 5/2009 | Aravamudan et al. |
| 7,580,363 B2 | 8/2009 | Sorvari et al. |
| 7,593,995 B1 | 9/2009 | He et al. |
| 7,606,860 B2 | 10/2009 | Puthenkulam et al. |
| 7,610,341 B2 | 10/2009 | Daniell |
| 7,620,407 B1 | 11/2009 | Donald et al. |
| 7,624,103 B2 | 11/2009 | Wiegering et al. |
| 7,627,598 B1 | 12/2009 | Burke |
| 7,634,463 B1 | 12/2009 | Katragadda et al. |
| 7,639,157 B1 | 12/2009 | Whitley et al. |
| 7,653,695 B2 | 1/2010 | Flury et al. |
| 7,685,144 B1 | 3/2010 | Katragadda |
| 7,692,653 B1 | 4/2010 | Petro et al. |
| 7,698,140 B2 | 4/2010 | Bhardwaj et al. |
| 7,702,730 B2 | 4/2010 | Spataro et al. |
| 7,707,249 B2 | 4/2010 | Spataro et al. |
| 7,707,509 B2 | 4/2010 | Naono et al. |
| 7,716,140 B1 | 5/2010 | Nielsen et al. |
| 7,720,916 B2 | 5/2010 | Fisher et al. |
| 7,724,878 B2 | 5/2010 | Timmins et al. |
| 7,725,492 B2 | 5/2010 | Sittig et al. |
| 7,730,010 B2 | 6/2010 | Kishore et al. |
| 7,743,051 B1 | 6/2010 | Kashyap et al. |
| 7,752,081 B2 | 7/2010 | Calabria |
| 7,756,895 B1 | 7/2010 | Emigh |
| 7,756,935 B2 | 7/2010 | Gaucas |
| 7,761,436 B2 | 7/2010 | Norton et al. |
| 7,788,260 B2 | 8/2010 | Lunt et al. |
| 7,805,492 B1 | 9/2010 | Thatcher et al. |
| 7,818,396 B2 | 10/2010 | Dolin et al. |
| 7,827,208 B2 | 11/2010 | Bosworth et al. |
| 7,827,265 B2 | 11/2010 | Cheever et al. |
| 7,831,676 B1 | 11/2010 | Nagar |
| 7,831,692 B2 | 11/2010 | French et al. |
| 7,836,045 B2 | 11/2010 | Schachter |
| 7,836,132 B2 | 11/2010 | Qureshi et al. |
| 7,836,134 B2 | 11/2010 | Pantalone |
| 7,849,141 B1 | 12/2010 | Bellegarda et al. |
| 7,849,142 B2 | 12/2010 | Clegg et al. |
| 7,853,602 B2 | 12/2010 | Gorti et al. |
| 7,853,881 B1 | 12/2010 | Aly Assal et al. |
| 7,865,562 B2 | 1/2011 | Nesbitt et al. |
| 7,870,197 B2 | 1/2011 | Lewis et al. |
| 7,899,806 B2 | 3/2011 | Aravamudan et al. |
| 7,899,871 B1 | 3/2011 | Kumar et al. |
| 7,908,647 B1 | 3/2011 | Polis et al. |
| 7,925,690 B2 | 4/2011 | Smith et al. |
| 7,930,430 B2 | 4/2011 | Thatcher et al. |
| 7,949,611 B1 | 5/2011 | Nielsen et al. |
| 7,949,627 B2 | 5/2011 | Aravamudan et al. |
| 7,970,832 B2 | 6/2011 | Perry, Jr. et al. |
| 7,979,569 B2 | 7/2011 | Eisner et al. |
| 7,991,764 B2 | 8/2011 | Rathod |
| 7,996,456 B2 | 8/2011 | Gross |
| 8,005,806 B2 | 8/2011 | Rupp et al. |
| 8,028,032 B2 | 9/2011 | Laird-McConnell |
| 8,032,598 B1 | 10/2011 | He et al. |
| 8,055,715 B2 | 11/2011 | Bensky et al. |
| 8,073,928 B2 | 12/2011 | Dolin et al. |
| 8,086,676 B2 | 12/2011 | Palahnuk et al. |
| 8,086,968 B2 | 12/2011 | McCaffrey et al. |
| 8,112,437 B1 | 2/2012 | Katragadda et al. |
| 8,140,566 B2 | 3/2012 | Boerries et al. |
| 8,145,791 B2 | 3/2012 | Thatcher et al. |
| 8,151,358 B1 | 4/2012 | Herold |
| 8,161,122 B2 | 4/2012 | Sood et al. |
| 8,200,761 B1 | 6/2012 | Tevanian |
| 8,200,808 B2 | 6/2012 | Ishida |
| 8,204,897 B1 | 6/2012 | Djabarov et al. |
| 8,239,197 B2 | 8/2012 | Webb et al. |
| 8,244,848 B1 | 8/2012 | Narayanan et al. |
| 8,271,025 B2 | 9/2012 | Brisebois et al. |
| 8,284,783 B1 | 10/2012 | Maufer et al. |
| 8,291,019 B1 | 10/2012 | Rochelle et al. |
| 8,296,179 B1 * | 10/2012 | Rennison ............ G06Q 30/0251 705/14.53 |
| 8,316,315 B2 | 11/2012 | Portnoy et al. |
| 8,363,803 B2 | 1/2013 | Gupta |
| 8,365,235 B2 | 1/2013 | Hunt et al. |

(56) References Cited

U.S. PATENT DOCUMENTS

| | | |
|---|---|---|
| 8,392,409 B1 | 3/2013 | Kashyap et al. |
| 8,392,836 B1 | 3/2013 | Bau et al. |
| 8,412,174 B2 | 4/2013 | Khosravi |
| 8,423,545 B2 | 4/2013 | Cort et al. |
| 8,433,762 B1 | 4/2013 | Wald et al. |
| 8,443,441 B2 | 5/2013 | Stolfo et al. |
| 8,447,789 B2 | 5/2013 | Geller |
| 8,452,745 B2 | 5/2013 | Ramakrishna |
| 8,463,872 B2 | 6/2013 | Pounds et al. |
| 8,468,168 B2 | 6/2013 | Brezina et al. |
| 8,495,045 B2 | 7/2013 | Wolf et al. |
| 8,510,389 B1 | 8/2013 | Gurajada et al. |
| 8,522,257 B2 | 8/2013 | Rupp et al. |
| 8,549,412 B2 | 10/2013 | Brezina et al. |
| 8,566,306 B2 | 10/2013 | Jones |
| 8,600,343 B2 | 12/2013 | Brezina et al. |
| 8,606,335 B2 | 12/2013 | Ozaki |
| 8,620,935 B2 | 12/2013 | Rubin et al. |
| 8,661,002 B2 | 2/2014 | Smith et al. |
| 8,666,035 B2 | 3/2014 | Timmins et al. |
| 8,694,633 B2 | 4/2014 | Mansfield et al. |
| 8,706,652 B2 | 4/2014 | Yang et al. |
| 8,717,933 B2 | 5/2014 | Fisher et al. |
| 8,745,060 B2 | 6/2014 | Brezina et al. |
| 8,754,848 B2 | 6/2014 | Holzer et al. |
| 8,768,291 B2 | 7/2014 | Williams et al. |
| 8,793,625 B2 | 7/2014 | Rhee et al. |
| 8,818,995 B1 | 8/2014 | Guha |
| 8,819,234 B1 | 8/2014 | Bauer et al. |
| 8,849,816 B2 | 9/2014 | Burba et al. |
| 8,850,343 B2 | 9/2014 | Klassen et al. |
| 8,924,956 B2 | 12/2014 | Smith |
| 8,930,463 B2 | 1/2015 | Bonforte et al. |
| 8,972,257 B2 | 3/2015 | Bonforte |
| 8,982,053 B2 | 3/2015 | Holzer et al. |
| 8,984,074 B2 | 3/2015 | Monaco |
| 8,990,323 B2 | 3/2015 | Hein et al. |
| 9,009,065 B2 | 4/2015 | Reis et al. |
| 9,020,938 B2 | 4/2015 | Cort et al. |
| 9,058,366 B2 | 6/2015 | Brezina et al. |
| 9,087,323 B2 | 7/2015 | Hein et al. |
| 9,159,057 B2 | 10/2015 | Monaco |
| 9,195,753 B1 | 11/2015 | King et al. |
| 9,195,969 B2 | 11/2015 | Bau et al. |
| 9,235,848 B1 | 1/2016 | Gourley et al. |
| 9,275,118 B2 | 3/2016 | Brezina et al. |
| 9,275,126 B2 | 3/2016 | Smith et al. |
| 9,298,783 B2 | 3/2016 | Brezina et al. |
| 9,304,621 B1 | 4/2016 | Wakim et al. |
| 9,501,561 B2 | 11/2016 | Rubin et al. |
| 9,514,466 B2 | 12/2016 | Jacobson et al. |
| 9,569,529 B2 | 2/2017 | Rubin et al. |
| 9,584,343 B2 | 2/2017 | Brezina et al. |
| 9,591,086 B2 | 3/2017 | Brezina et al. |
| 9,594,832 B2 | 3/2017 | Rubin et al. |
| 9,596,308 B2 | 3/2017 | Brezina et al. |
| 9,685,158 B2 | 6/2017 | Bonforte |
| 9,699,258 B2 | 7/2017 | Brezina et al. |
| 9,716,764 B2 | 7/2017 | Brezina et al. |
| 9,721,228 B2 | 8/2017 | Cort et al. |
| 9,747,583 B2 | 8/2017 | Monaco |
| 9,760,866 B2 | 9/2017 | Quintela et al. |
| 2001/0022792 A1 | 9/2001 | Maeno et al. |
| 2001/0037407 A1 | 11/2001 | Dragulev et al. |
| 2001/0049628 A1 | 12/2001 | Icho |
| 2002/0007310 A1 | 1/2002 | Long |
| 2002/0016818 A1 | 2/2002 | Kirani et al. |
| 2002/0024536 A1 | 2/2002 | Kahan et al. |
| 2002/0049751 A1 | 4/2002 | Chen et al. |
| 2002/0054587 A1 | 5/2002 | Baker et al. |
| 2002/0059402 A1 | 5/2002 | Belanger |
| 2002/0059418 A1 | 5/2002 | Bird et al. |
| 2002/0059425 A1 | 5/2002 | Belfiore et al. |
| 2002/0073011 A1 | 6/2002 | Brattain et al. |
| 2002/0073058 A1* | 6/2002 | Kremer .......... G06F 17/30864 |
| 2002/0076004 A1 | 6/2002 | Brockenbrough et al. |
| 2002/0078090 A1 | 6/2002 | Hwang et al. |
| 2002/0087647 A1 | 7/2002 | Quine et al. |
| 2002/0091777 A1 | 7/2002 | Schwartz |
| 2002/0103873 A1 | 8/2002 | Ramanathan et al. |
| 2002/0103879 A1 | 8/2002 | Mondragon |
| 2002/0107991 A1 | 8/2002 | Maguire et al. |
| 2002/0116396 A1 | 8/2002 | Somers et al. |
| 2002/0143871 A1 | 10/2002 | Meyer et al. |
| 2002/0152216 A1* | 10/2002 | Bouthors .......... G06F 17/30867 |
| 2002/0163539 A1 | 11/2002 | Srinivasan |
| 2002/0194502 A1 | 12/2002 | Sheth et al. |
| 2003/0028525 A1 | 2/2003 | Santos et al. |
| 2003/0037116 A1 | 2/2003 | Nolan et al. |
| 2003/0041030 A1 | 2/2003 | Mansfield |
| 2003/0093483 A1 | 5/2003 | Allen et al. |
| 2003/0114171 A1 | 6/2003 | Miyamoto |
| 2003/0114956 A1 | 6/2003 | Cullen et al. |
| 2003/0120608 A1 | 6/2003 | Pereyra |
| 2003/0131062 A1 | 7/2003 | Miyashita |
| 2003/0142125 A1 | 7/2003 | Salmimaa et al. |
| 2003/0167324 A1 | 9/2003 | Farnham et al. |
| 2003/0195937 A1 | 10/2003 | Kircher, Jr. et al. |
| 2003/0204439 A1 | 10/2003 | Cullen, III |
| 2003/0217106 A1 | 11/2003 | Adar et al. |
| 2003/0220835 A1 | 11/2003 | Barnes, Jr. |
| 2003/0220978 A1 | 11/2003 | Rhodes |
| 2003/0220989 A1 | 11/2003 | Tsuji et al. |
| 2003/0233419 A1 | 12/2003 | Beringer |
| 2004/0002903 A1 | 1/2004 | Stolfo et al. |
| 2004/0015547 A1 | 1/2004 | Griffin et al. |
| 2004/0015554 A1 | 1/2004 | Wilson |
| 2004/0034537 A1 | 2/2004 | Gengarella et al. |
| 2004/0039630 A1 | 2/2004 | Begole et al. |
| 2004/0056901 A1 | 3/2004 | March et al. |
| 2004/0068545 A1 | 4/2004 | Daniell et al. |
| 2004/0073616 A1 | 4/2004 | Fellenstein et al. |
| 2004/0078443 A1 | 4/2004 | Malik |
| 2004/0078444 A1 | 4/2004 | Malik |
| 2004/0078445 A1 | 4/2004 | Malik |
| 2004/0100497 A1 | 5/2004 | Quillen et al. |
| 2004/0122904 A1 | 6/2004 | Kim |
| 2004/0128355 A1 | 7/2004 | Chao et al. |
| 2004/0128356 A1 | 7/2004 | Bernstein et al. |
| 2004/0133561 A1 | 7/2004 | Burke |
| 2004/0133809 A1 | 7/2004 | Dahl et al. |
| 2004/0153504 A1 | 8/2004 | Hutchinson et al. |
| 2004/0162878 A1 | 8/2004 | Lewis et al. |
| 2004/0174964 A1 | 9/2004 | Koch |
| 2004/0177048 A1 | 9/2004 | Klug |
| 2004/0186851 A1 | 9/2004 | Jhingan et al. |
| 2004/0202117 A1 | 10/2004 | Wilson et al. |
| 2004/0205002 A1 | 10/2004 | Layton |
| 2004/0210827 A1 | 10/2004 | Burg et al. |
| 2004/0215726 A1 | 10/2004 | Arning et al. |
| 2004/0215734 A1 | 10/2004 | Nagai et al. |
| 2004/0236749 A1 | 11/2004 | Cortright et al. |
| 2004/0260756 A1 | 12/2004 | Forstall et al. |
| 2004/0268229 A1 | 12/2004 | Paoli et al. |
| 2005/0015432 A1 | 1/2005 | Cohen |
| 2005/0027699 A1 | 2/2005 | Awadallah et al. |
| 2005/0027779 A1 | 2/2005 | Schinner |
| 2005/0038687 A1 | 2/2005 | Galdes |
| 2005/0044152 A1 | 2/2005 | Hardy et al. |
| 2005/0049896 A1 | 3/2005 | Giunta |
| 2005/0055409 A1 | 3/2005 | Alsarraf et al. |
| 2005/0055639 A1 | 3/2005 | Fogg |
| 2005/0060638 A1 | 3/2005 | Mathew et al. |
| 2005/0076090 A1 | 4/2005 | Thuerk |
| 2005/0076221 A1 | 4/2005 | Olkin et al. |
| 2005/0080868 A1 | 4/2005 | Malik |
| 2005/0090911 A1 | 4/2005 | Ingargiola et al. |
| 2005/0091272 A1 | 4/2005 | Smith et al. |
| 2005/0091314 A1 | 4/2005 | Blagsvedt et al. |
| 2005/0091401 A1 | 4/2005 | Keohane et al. |
| 2005/0102257 A1 | 5/2005 | Onyon et al. |
| 2005/0102361 A1 | 5/2005 | Winjum et al. |
| 2005/0108273 A1 | 5/2005 | Brebner |
| 2005/0131888 A1 | 6/2005 | Tafoya et al. |

(56) References Cited

U.S. PATENT DOCUMENTS

| | | |
|---|---|---|
| 2005/0138070 A1 | 6/2005 | Huberman et al. |
| 2005/0138631 A1 | 6/2005 | Bellotti et al. |
| 2005/0140653 A1 | 6/2005 | Pletikosa et al. |
| 2005/0149620 A1 | 7/2005 | Kirkland et al. |
| 2005/0159970 A1 | 7/2005 | Buyukkokten et al. |
| 2005/0164704 A1 | 7/2005 | Winsor |
| 2005/0165584 A1 | 7/2005 | Boody et al. |
| 2005/0165893 A1 | 7/2005 | Feinberg et al. |
| 2005/0172234 A1 | 8/2005 | Chuchla |
| 2005/0188028 A1 | 8/2005 | Brown, Jr. et al. |
| 2005/0198159 A1 | 9/2005 | Kirsch |
| 2005/0198299 A1 | 9/2005 | Beck et al. |
| 2005/0198305 A1 | 9/2005 | Pezaris et al. |
| 2005/0203929 A1 | 9/2005 | Hazarika et al. |
| 2005/0204009 A1 | 9/2005 | Hazarika et al. |
| 2005/0210111 A1 | 9/2005 | Fukudome |
| 2005/0213511 A1 | 9/2005 | Reece, Jr. et al. |
| 2005/0216300 A1 | 9/2005 | Appelman et al. |
| 2005/0222890 A1 | 10/2005 | Cheng et al. |
| 2005/0223315 A1 | 10/2005 | Shimizu et al. |
| 2005/0228881 A1 | 10/2005 | Reasor et al. |
| 2005/0228899 A1 | 10/2005 | Wendkos et al. |
| 2005/0235224 A1 | 10/2005 | Arend et al. |
| 2005/0278317 A1 | 12/2005 | Gross et al. |
| 2005/0278321 A1 | 12/2005 | Vailaya et al. |
| 2006/0004713 A1 | 1/2006 | Korte et al. |
| 2006/0004892 A1 | 1/2006 | Lunt et al. |
| 2006/0004914 A1 | 1/2006 | Kelly et al. |
| 2006/0015533 A1 | 1/2006 | Wolf et al. |
| 2006/0020398 A1 | 1/2006 | Vernon et al. |
| 2006/0031340 A1 | 2/2006 | Mathew et al. |
| 2006/0031775 A1 | 2/2006 | Sattler et al. |
| 2006/0041508 A1 | 2/2006 | Pham et al. |
| 2006/0047747 A1 | 3/2006 | Erickson et al. |
| 2006/0053199 A1 | 3/2006 | Pricken et al. |
| 2006/0056015 A1 | 3/2006 | Nishiyama |
| 2006/0059151 A1 | 3/2006 | Martinez et al. |
| 2006/0059238 A1 | 3/2006 | Slater et al. |
| 2006/0064431 A1 | 3/2006 | Kishore et al. |
| 2006/0064434 A1 | 3/2006 | Gilbert et al. |
| 2006/0065733 A1 | 3/2006 | Lee et al. |
| 2006/0074932 A1 | 4/2006 | Fong et al. |
| 2006/0075046 A1 | 4/2006 | Yozell-Epstein et al. |
| 2006/0083357 A1 | 4/2006 | Howell et al. |
| 2006/0083358 A1 | 4/2006 | Fong et al. |
| 2006/0085752 A1 | 4/2006 | Beadle et al. |
| 2006/0095331 A1 | 5/2006 | O'Malley et al. |
| 2006/0095502 A1 | 5/2006 | Lewis et al. |
| 2006/0101285 A1 | 5/2006 | Chen et al. |
| 2006/0101334 A1 | 5/2006 | Liao et al. |
| 2006/0101350 A1 | 5/2006 | Scott |
| 2006/0106793 A1 | 5/2006 | Liang |
| 2006/0123357 A1 | 6/2006 | Okamura |
| 2006/0129844 A1 | 6/2006 | Oshikiri |
| 2006/0136494 A1 | 6/2006 | Oh |
| 2006/0168059 A1 | 7/2006 | Chang et al. |
| 2006/0168073 A1 | 7/2006 | Kogan et al. |
| 2006/0172362 A1 | 8/2006 | Yael et al. |
| 2006/0173824 A1 | 8/2006 | Bensky et al. |
| 2006/0173961 A1 | 8/2006 | Turski et al. |
| 2006/0179415 A1 | 8/2006 | Cadiz et al. |
| 2006/0195361 A1 | 8/2006 | Rosenberg |
| 2006/0195474 A1 | 8/2006 | Cadiz et al. |
| 2006/0195785 A1 | 8/2006 | Portnoy et al. |
| 2006/0217116 A1 | 9/2006 | Cassett et al. |
| 2006/0218111 A1 | 9/2006 | Cohen |
| 2006/0224675 A1 | 10/2006 | Fox et al. |
| 2006/0224938 A1 | 10/2006 | Fikes et al. |
| 2006/0242536 A1 | 10/2006 | Yokokawa et al. |
| 2006/0242609 A1 | 10/2006 | Potter et al. |
| 2006/0248151 A1 | 11/2006 | Belakovskiy et al. |
| 2006/0256008 A1 | 11/2006 | Rosenberg |
| 2006/0271630 A1 | 11/2006 | Bensky et al. |
| 2006/0281447 A1 | 12/2006 | Lewis et al. |
| 2006/0282303 A1 | 12/2006 | Hale et al. |
| 2007/0005702 A1 | 1/2007 | Tokuda et al. |
| 2007/0005715 A1 | 1/2007 | LeVasseur et al. |
| 2007/0005750 A1 | 1/2007 | Lunt et al. |
| 2007/0011367 A1 | 1/2007 | Scott et al. |
| 2007/0016647 A1 | 1/2007 | Gupta et al. |
| 2007/0022447 A1 | 1/2007 | Arseneau et al. |
| 2007/0038720 A1 | 2/2007 | Reding et al. |
| 2007/0050455 A1 | 3/2007 | Yach et al. |
| 2007/0050711 A1 | 3/2007 | Walker et al. |
| 2007/0060328 A1 | 3/2007 | Zrike et al. |
| 2007/0071187 A1 | 3/2007 | Apreutesei et al. |
| 2007/0073652 A1 | 3/2007 | Taboada et al. |
| 2007/0078884 A1 | 4/2007 | Ott, IV et al. |
| 2007/0083651 A1 | 4/2007 | Ishida |
| 2007/0088687 A1 | 4/2007 | Bromm et al. |
| 2007/0106780 A1 | 5/2007 | Farnham et al. |
| 2007/0112761 A1 | 5/2007 | Xu et al. |
| 2007/0115991 A1 | 5/2007 | Ramani et al. |
| 2007/0118528 A1 | 5/2007 | Choi et al. |
| 2007/0118533 A1 | 5/2007 | Ramer et al. |
| 2007/0123222 A1 | 5/2007 | Cox et al. |
| 2007/0124432 A1 | 5/2007 | Holtzman et al. |
| 2007/0129977 A1 | 6/2007 | Forney |
| 2007/0130527 A1 | 6/2007 | Kim |
| 2007/0135110 A1 | 6/2007 | Athale et al. |
| 2007/0143414 A1 | 6/2007 | Daigle |
| 2007/0153989 A1 | 7/2007 | Howell et al. |
| 2007/0156732 A1 | 7/2007 | Surendran et al. |
| 2007/0162432 A1 | 7/2007 | Armstrong et al. |
| 2007/0174304 A1 | 7/2007 | Shrufi et al. |
| 2007/0174432 A1 | 7/2007 | Rhee et al. |
| 2007/0177717 A1 | 8/2007 | Owens et al. |
| 2007/0185844 A1 | 8/2007 | Schachter |
| 2007/0192490 A1 | 8/2007 | Minhas |
| 2007/0192699 A1 | 8/2007 | Lee et al. |
| 2007/0198500 A1 | 8/2007 | Lucovsky et al. |
| 2007/0203991 A1 | 8/2007 | Fisher et al. |
| 2007/0208802 A1* | 9/2007 | Barman .............. G06Q 10/10 709/203 |
| 2007/0214141 A1 | 9/2007 | Sittig et al. |
| 2007/0218900 A1 | 9/2007 | Abhyanker |
| 2007/0244881 A1 | 10/2007 | Cha et al. |
| 2007/0250585 A1 | 10/2007 | Ly et al. |
| 2007/0255794 A1 | 11/2007 | Coutts |
| 2007/0266001 A1 | 11/2007 | Williams et al. |
| 2007/0271527 A1 | 11/2007 | Paas et al. |
| 2007/0273517 A1 | 11/2007 | Govind |
| 2007/0282956 A1 | 12/2007 | Staats |
| 2007/0288578 A1 | 12/2007 | Pantalone |
| 2007/0294428 A1 | 12/2007 | Guy et al. |
| 2008/0005247 A9 | 1/2008 | Khoo |
| 2008/0005249 A1 | 1/2008 | Hart |
| 2008/0010460 A1 | 1/2008 | Schuschan |
| 2008/0031241 A1 | 2/2008 | Toebes et al. |
| 2008/0037721 A1 | 2/2008 | Yao et al. |
| 2008/0040370 A1 | 2/2008 | Bosworth et al. |
| 2008/0040435 A1 | 2/2008 | Buschi et al. |
| 2008/0040474 A1 | 2/2008 | Zuckerberg et al. |
| 2008/0040475 A1 | 2/2008 | Bosworth et al. |
| 2008/0055263 A1 | 3/2008 | Lemay et al. |
| 2008/0056269 A1 | 3/2008 | Madhani et al. |
| 2008/0059428 A1 | 3/2008 | Kinder |
| 2008/0065701 A1 | 3/2008 | Lindstrom et al. |
| 2008/0071872 A1 | 3/2008 | Gross |
| 2008/0077614 A1* | 3/2008 | Roy .............. G06F 17/30702 |
| 2008/0104052 A1 | 5/2008 | Ryan et al. |
| 2008/0113674 A1 | 5/2008 | Baig |
| 2008/0114758 A1 | 5/2008 | Rupp et al. |
| 2008/0119201 A1 | 5/2008 | Kolber et al. |
| 2008/0120411 A1 | 5/2008 | Eberle |
| 2008/0122796 A1 | 5/2008 | Jobs et al. |
| 2008/0134081 A1 | 6/2008 | Jeon et al. |
| 2008/0147639 A1 | 6/2008 | Hartman et al. |
| 2008/0147810 A1 | 6/2008 | Kumar et al. |
| 2008/0154751 A1 | 6/2008 | Miles |
| 2008/0162347 A1 | 7/2008 | Wagner |
| 2008/0162649 A1 | 7/2008 | Lee et al. |
| 2008/0162651 A1 | 7/2008 | Madnani |
| 2008/0163164 A1 | 7/2008 | Chowdhary et al. |

(56) References Cited

U.S. PATENT DOCUMENTS

| | | |
|---|---|---|
| 2008/0170158 A1 | 7/2008 | Jung et al. |
| 2008/0172464 A1 | 7/2008 | Thattai et al. |
| 2008/0183832 A1 | 7/2008 | Kirkland et al. |
| 2008/0189122 A1 | 8/2008 | Coletrane et al. |
| 2008/0201304 A1 | 8/2008 | Sue |
| 2008/0208812 A1 | 8/2008 | Quoc et al. |
| 2008/0216092 A1 | 9/2008 | Serlet |
| 2008/0220752 A1 | 9/2008 | Forstall et al. |
| 2008/0222279 A1 | 9/2008 | Cioffi et al. |
| 2008/0222546 A1 | 9/2008 | Mudd et al. |
| 2008/0235353 A1 | 9/2008 | Cheever et al. |
| 2008/0235681 A1 | 9/2008 | Barnett |
| 2008/0242277 A1 | 10/2008 | Chen et al. |
| 2008/0243841 A1 | 10/2008 | Bonnet et al. |
| 2008/0244070 A1 | 10/2008 | Kita et al. |
| 2008/0261569 A1 | 10/2008 | Britt et al. |
| 2008/0270038 A1 | 10/2008 | Partovi et al. |
| 2008/0270939 A1 | 10/2008 | Mueller |
| 2008/0275748 A1 | 11/2008 | John |
| 2008/0275865 A1 | 11/2008 | Kretz et al. |
| 2008/0290987 A1 | 11/2008 | Li |
| 2008/0293403 A1 | 11/2008 | Quon et al. |
| 2008/0301166 A1 | 12/2008 | Sugiyama et al. |
| 2008/0301175 A1 | 12/2008 | Applebaum et al. |
| 2008/0301245 A1 | 12/2008 | Estrada et al. |
| 2008/0307046 A1 | 12/2008 | Baek et al. |
| 2008/0307066 A1 | 12/2008 | Amidon et al. |
| 2008/0313650 A1 | 12/2008 | Arnquist et al. |
| 2008/0319943 A1 | 12/2008 | Fischer |
| 2008/0320417 A1 | 12/2008 | Begley et al. |
| 2009/0005076 A1 | 1/2009 | Forstall et al. |
| 2009/0006366 A1 | 1/2009 | Johnson et al. |
| 2009/0010353 A1 | 1/2009 | She et al. |
| 2009/0012806 A1 | 1/2009 | Ricordi et al. |
| 2009/0029674 A1 | 1/2009 | Brezina et al. |
| 2009/0030773 A1 | 1/2009 | Kamhoot |
| 2009/0030872 A1 | 1/2009 | Brezina et al. |
| 2009/0030919 A1 | 1/2009 | Brezina et al. |
| 2009/0030927 A1 | 1/2009 | Cases et al. |
| 2009/0030933 A1 | 1/2009 | Brezina et al. |
| 2009/0030940 A1 | 1/2009 | Brezina et al. |
| 2009/0031232 A1 | 1/2009 | Brezina et al. |
| 2009/0031244 A1 | 1/2009 | Brezina et al. |
| 2009/0031245 A1 | 1/2009 | Brezina et al. |
| 2009/0037541 A1 | 2/2009 | Wilson |
| 2009/0041224 A1 | 2/2009 | Bychkov et al. |
| 2009/0048994 A1 | 2/2009 | Applebaum et al. |
| 2009/0054091 A1 | 2/2009 | van Wijk et al. |
| 2009/0070412 A1 | 3/2009 | D'Angelo et al. |
| 2009/0077026 A1 | 3/2009 | Yanagihara |
| 2009/0083278 A1 | 3/2009 | Zhao et al. |
| 2009/0100384 A1 | 4/2009 | Louch |
| 2009/0106415 A1 | 4/2009 | Brezina et al. |
| 2009/0106676 A1 | 4/2009 | Brezina et al. |
| 2009/0111495 A1 | 4/2009 | Sjolin et al. |
| 2009/0112678 A1 | 4/2009 | Luzardo |
| 2009/0119678 A1 | 5/2009 | Shih et al. |
| 2009/0125321 A1 | 5/2009 | Charlebois et al. |
| 2009/0125462 A1 | 5/2009 | Krishnaswamy et al. |
| 2009/0125517 A1 | 5/2009 | Krishnaswamy et al. |
| 2009/0125585 A1 | 5/2009 | Krishnaswamy et al. |
| 2009/0132949 A1 | 5/2009 | Bosarge |
| 2009/0150251 A1 | 6/2009 | Zhitomirsky |
| 2009/0156170 A1 | 6/2009 | Rossano et al. |
| 2009/0157717 A1 | 6/2009 | Palahnuk et al. |
| 2009/0164902 A1 | 6/2009 | Cohen et al. |
| 2009/0171930 A1 | 7/2009 | Vaughan et al. |
| 2009/0171979 A1 | 7/2009 | Lubarski et al. |
| 2009/0174680 A1 | 7/2009 | Anzures et al. |
| 2009/0177754 A1 | 7/2009 | Brezina et al. |
| 2009/0182552 A1 | 7/2009 | Fyke et al. |
| 2009/0182788 A1 | 7/2009 | Chung et al. |
| 2009/0187991 A1 | 7/2009 | Freericks et al. |
| 2009/0191899 A1 | 7/2009 | Wilson et al. |
| 2009/0198688 A1 | 8/2009 | Venkataraman et al. |
| 2009/0204903 A1 | 8/2009 | Edelen et al. |
| 2009/0209286 A1 | 8/2009 | Bentley et al. |
| 2009/0213088 A1 | 8/2009 | Hardy et al. |
| 2009/0216847 A1 | 8/2009 | Krishnaswamy et al. |
| 2009/0217178 A1 | 8/2009 | Niyogi et al. |
| 2009/0228555 A1 | 9/2009 | Joviak et al. |
| 2009/0234815 A1 | 9/2009 | Boerries et al. |
| 2009/0234925 A1 | 9/2009 | Seippel, III et al. |
| 2009/0240669 A1 | 9/2009 | Ando et al. |
| 2009/0248415 A1 | 10/2009 | Jablokov et al. |
| 2009/0249198 A1 | 10/2009 | Davis et al. |
| 2009/0271370 A1 | 10/2009 | Jagadish et al. |
| 2009/0271409 A1 | 10/2009 | Ghosh |
| 2009/0276713 A1 | 11/2009 | Eddy |
| 2009/0299824 A1 | 12/2009 | Barnes, Jr. |
| 2009/0300127 A1 | 12/2009 | Du |
| 2009/0300546 A1 | 12/2009 | Kwok et al. |
| 2009/0300596 A1 | 12/2009 | Tyhurst et al. |
| 2009/0306981 A1 | 12/2009 | Cromack et al. |
| 2009/0313573 A1 | 12/2009 | Paek et al. |
| 2009/0319329 A1 | 12/2009 | Aggarwal et al. |
| 2009/0327226 A1 | 12/2009 | Brito et al. |
| 2009/0327849 A1 | 12/2009 | Kavanagh et al. |
| 2009/0328161 A1 | 12/2009 | Puthenkulam et al. |
| 2010/0009332 A1 | 1/2010 | Yaskin et al. |
| 2010/0015954 A1 | 1/2010 | Yang |
| 2010/0030715 A1 | 2/2010 | Eustice et al. |
| 2010/0036833 A1 | 2/2010 | Yeung et al. |
| 2010/0049534 A1 | 2/2010 | Whitnah et al. |
| 2010/0057858 A1 | 3/2010 | Shen et al. |
| 2010/0057859 A1 | 3/2010 | Shen et al. |
| 2010/0060595 A1 | 3/2010 | Lee et al. |
| 2010/0062753 A1 | 3/2010 | Wen et al. |
| 2010/0070875 A1 | 3/2010 | Turski et al. |
| 2010/0073284 A1 | 3/2010 | Dods et al. |
| 2010/0077041 A1 | 3/2010 | Cowan et al. |
| 2010/0082693 A1 | 4/2010 | Hugg et al. |
| 2010/0083182 A1 | 4/2010 | Liu et al. |
| 2010/0088340 A1 | 4/2010 | Muller et al. |
| 2010/0094869 A1 | 4/2010 | Ebanks |
| 2010/0094911 A1 | 4/2010 | Bird |
| 2010/0100899 A1 | 4/2010 | Bradbury et al. |
| 2010/0121831 A1 | 5/2010 | Lin et al. |
| 2010/0131447 A1 | 5/2010 | Creutz et al. |
| 2010/0153832 A1 | 6/2010 | Markus et al. |
| 2010/0158214 A1 | 6/2010 | Gravino et al. |
| 2010/0161547 A1 | 6/2010 | Carmel et al. |
| 2010/0161729 A1 | 6/2010 | Leblanc et al. |
| 2010/0162171 A1 | 6/2010 | Felt et al. |
| 2010/0164957 A1 | 7/2010 | Lindsay et al. |
| 2010/0167700 A1 | 7/2010 | Brock et al. |
| 2010/0169327 A1 | 7/2010 | Lindsay et al. |
| 2010/0174784 A1 | 7/2010 | Levey et al. |
| 2010/0185610 A1 | 7/2010 | Lunt et al. |
| 2010/0191844 A1 | 7/2010 | He et al. |
| 2010/0216509 A1 | 8/2010 | Riemer et al. |
| 2010/0228560 A1 | 9/2010 | Balasaygun et al. |
| 2010/0229096 A1 | 9/2010 | Maiocco et al. |
| 2010/0229157 A1 | 9/2010 | Ergan et al. |
| 2010/0229223 A1 | 9/2010 | Shepard et al. |
| 2010/0235375 A1 | 9/2010 | Sidhu et al. |
| 2010/0241579 A1 | 9/2010 | Bassett et al. |
| 2010/0250682 A1 | 9/2010 | Goldberg et al. |
| 2010/0273456 A1 | 10/2010 | Wolovitz et al. |
| 2010/0281535 A1 | 11/2010 | Perry, Jr. et al. |
| 2010/0306185 A1 | 12/2010 | Smith et al. |
| 2010/0312837 A1 | 12/2010 | Bodapati et al. |
| 2010/0318614 A1 | 12/2010 | Sager et al. |
| 2010/0330972 A1 | 12/2010 | Angiolillo |
| 2011/0010423 A1 | 1/2011 | Thatcher et al. |
| 2011/0035451 A1 | 2/2011 | Smith et al. |
| 2011/0040726 A1 | 2/2011 | Crosbie et al. |
| 2011/0072052 A1 | 3/2011 | Skarin et al. |
| 2011/0078259 A1 | 3/2011 | Rashad et al. |
| 2011/0086627 A1 | 4/2011 | Khosravi |
| 2011/0087969 A1 | 4/2011 | Hein et al. |
| 2011/0119593 A1 | 5/2011 | Jacobson et al. |
| 2011/0145192 A1 | 6/2011 | Quintela et al. |
| 2011/0145219 A1 | 6/2011 | Cierniak et al. |

(56) References Cited

U.S. PATENT DOCUMENTS

| | | |
|---|---|---|
| 2011/0173274 A1 | 7/2011 | Sood |
| 2011/0173547 A1 | 7/2011 | Lewis et al. |
| 2011/0191337 A1 | 8/2011 | Cort et al. |
| 2011/0191340 A1 | 8/2011 | Cort et al. |
| 2011/0191717 A1 | 8/2011 | Cort et al. |
| 2011/0191768 A1 | 8/2011 | Smith |
| 2011/0196802 A1 | 8/2011 | Ellis et al. |
| 2011/0201275 A1 | 8/2011 | Jabara et al. |
| 2011/0219317 A1 | 9/2011 | Thatcher et al. |
| 2011/0225293 A1 | 9/2011 | Rathod |
| 2011/0231407 A1 | 9/2011 | Gupta et al. |
| 2011/0235790 A1 | 9/2011 | Strope et al. |
| 2011/0252383 A1 | 10/2011 | Miyashita |
| 2011/0276396 A1 | 11/2011 | Rathod |
| 2011/0282905 A1 | 11/2011 | Polis et al. |
| 2011/0291860 A1 | 12/2011 | Ozaki et al. |
| 2011/0291933 A1 | 12/2011 | Holzer et al. |
| 2011/0298701 A1 | 12/2011 | Holzer et al. |
| 2012/0011204 A1 | 1/2012 | Morin et al. |
| 2012/0017158 A1 | 1/2012 | Maguire et al. |
| 2012/0023416 A1 | 1/2012 | Khoo |
| 2012/0036254 A1 | 2/2012 | Onuma |
| 2012/0041907 A1 | 2/2012 | Wang et al. |
| 2012/0054681 A1 | 3/2012 | Cort et al. |
| 2012/0060102 A1 | 3/2012 | Shohfi et al. |
| 2012/0079023 A1 | 3/2012 | Tejada-Gamero et al. |
| 2012/0084461 A1 | 4/2012 | Athias et al. |
| 2012/0089678 A1 | 4/2012 | Cort et al. |
| 2012/0089690 A1 | 4/2012 | Hein et al. |
| 2012/0110080 A1 | 5/2012 | Panyam et al. |
| 2012/0110096 A1 | 5/2012 | Smarr et al. |
| 2012/0150970 A1 | 6/2012 | Peterson et al. |
| 2012/0150978 A1 | 6/2012 | Monaco et al. |
| 2012/0150979 A1 | 6/2012 | Monaco |
| 2012/0166999 A1 | 6/2012 | Thatcher et al. |
| 2012/0197871 A1 | 8/2012 | Mandel et al. |
| 2012/0198348 A1 | 8/2012 | Park |
| 2012/0204089 A1 | 8/2012 | Boudreau et al. |
| 2012/0246065 A1 | 9/2012 | Yarvis et al. |
| 2012/0259834 A1 | 10/2012 | Broder et al. |
| 2012/0271822 A1 | 10/2012 | Schwendimann et al. |
| 2012/0278428 A1 | 11/2012 | Harrison et al. |
| 2012/0310977 A1 | 12/2012 | Bush et al. |
| 2012/0330658 A1 | 12/2012 | Bonforte |
| 2012/0330980 A1 | 12/2012 | Rubin et al. |
| 2012/0331418 A1 | 12/2012 | Bonforte |
| 2013/0007627 A1 | 1/2013 | Monaco |
| 2013/0014021 A1 | 1/2013 | Bau et al. |
| 2013/0053074 A1 | 2/2013 | Sanchez et al. |
| 2013/0080915 A1 | 3/2013 | Lewis et al. |
| 2013/0091288 A1 | 4/2013 | Shalunov et al. |
| 2013/0120444 A1 | 5/2013 | Allyn et al. |
| 2013/0173712 A1 | 7/2013 | Monjas Llorente et al. |
| 2013/0246931 A1 | 9/2013 | Harris et al. |
| 2013/0260795 A1 | 10/2013 | Papakipos et al. |
| 2014/0011481 A1 | 1/2014 | Kho |
| 2014/0081914 A1 | 3/2014 | Smith et al. |
| 2014/0081964 A1 | 3/2014 | Rubin et al. |
| 2014/0087687 A1 | 3/2014 | Brezina et al. |
| 2014/0089304 A1 | 3/2014 | Rubin et al. |
| 2014/0089411 A1 | 3/2014 | Rubin et al. |
| 2014/0095433 A1 | 4/2014 | Cort et al. |
| 2014/0100861 A1 | 4/2014 | Ledet |
| 2014/0115086 A1 | 4/2014 | Chebiyyam |
| 2014/0156650 A1 | 6/2014 | Jacobson |
| 2014/0207761 A1 | 7/2014 | Brezina et al. |
| 2014/0214981 A1 | 7/2014 | Mallet et al. |
| 2014/0215626 A1 | 7/2014 | Pam et al. |
| 2014/0280097 A1 | 9/2014 | Lee et al. |
| 2014/0287786 A1 | 9/2014 | Bayraktar et al. |
| 2015/0074213 A1 | 3/2015 | Monaco |
| 2015/0170650 A1 | 6/2015 | Bonforte |
| 2015/0222719 A1 | 8/2015 | Hein et al. |
| 2016/0182661 A1 | 6/2016 | Brezina et al. |
| 2017/0083190 A1 | 3/2017 | Jacobson et al. |
| 2017/0147699 A1 | 5/2017 | Rubin et al. |
| 2017/0171124 A1 | 6/2017 | Brezina et al. |
| 2017/0187663 A1 | 6/2017 | Brezina et al. |

FOREIGN PATENT DOCUMENTS

| | | |
|---|---|---|
| JP | 2003006116 | 1/2003 |
| JP | 2007249307 | 9/2007 |
| KR | 20060056015 | 5/2006 |
| KR | 1020090068819 | 6/2009 |
| KR | 1020090112257 | 10/2009 |
| KR | 1020090115239 | 11/2009 |
| KR | 1020020060386 | 8/2012 |
| WO | 2003098515 | 11/2003 |
| WO | 2007037875 | 4/2007 |
| WO | 2007143232 | 12/2007 |
| WO | 2012082886 | 6/2012 |
| WO | 2012082929 | 6/2012 |

OTHER PUBLICATIONS

Android-Tips.com, "Android Tips & Tricks: How to Import Contacts into Android Phone," located at http://android-tips.com/how-to-import-contacts-into-android/, Nov. 17, 2008.

Bernstein, Michael S. et al., "Enhancing Directed Content Sharing on the Web," Proceedings of the 28th International Conference on Human Factors in Computing Systems, Atlanta, GA, Apr. 10-15, 2010, pp. 971-980.

Carvalho, Vitor R. et al., "Ranking Users for Intelligent Message Addressing," Proceedings of the 30th European Conference on Information Retrieval, Glasgow, England, Mar. 30-Apr. 3, 2008, pp. 321-333.

Culotta, Aron et al., "Extracting Social Networks and Contact Information from Email and the Web," Proceedings of the First Conference on Email and Anti-Spam (CEAS), Mountain View, CA, Jul. 30-31, 2004.

Elsayed, Tamer et al., "Personal Name Resolution in Email: A Heuristic Approach," University of Maryland Technical Report No. TR-LAMP-150, Mar. 17, 2008.

European Patent Application No. 11849271.9, Extended Search Report, dated Apr. 3, 2014.

European Patent Application No. 12801970.0, Extended Search Report, dated Oct. 23, 2014.

Extended European Search Report, EP 10 78 3783, dated Mar. 24, 2014.

Fitzpatrick, Brad, "AddressBooker," Github Social Coding, located at http://addressbooker.appspot.com/, Nov. 28, 2008.

Google Inc. "OpenSocial Tutorial," located at http://code.google.com/apis/opensocial/articles/tutorial/tutorial-0.8.html, Aug. 2008.

Google Inc., "Automatic Updating of Contacts," Gmail help forum, located at http://74.125.4.16/support/forum/p/gmail/thread?tid=03f7b692150d9242&hl=en, Apr. 27, 2009.

Hillebrand, Tim, "Plaxo: The Smart Auto Update Address Book," Smart Phone Mag, located at http://www.smartphonemag.com/cms/blogs/9/plaxo_the_smart_auto_update_address_book, Nov. 6, 2006.

International Patent Application PCT/US10/34782, International Search Report and Written Opinion, dated Dec. 22, 2010.

International Patent Application PCT/US10/35405, International Search Report and Written Opinion, dated Jan. 3, 2011.

International Patent Application PCT/US10/52081, International Search Report and Written Opinion, dated May 20, 2011.

International Patent Application PCT/US10/56560, International Search Report and Written Opinion, dated Jun. 21, 2011.

International Patent Application PCT/US11/64958, International Search Report and Written Opinion, dated Jul. 31, 2012.

International Patent Application PCT/US12/043523, International Search Report and Written Opinion, dated Nov. 28, 2012.

International Patent Application PCT/US2011/064892, International Search Report and Written Opinion, dated Aug. 22, 2012.

International Patent Application PCT/US2012/043507, International Search Report and Written Opinion, dated Jan. 3, 2013.

(56) References Cited

OTHER PUBLICATIONS

Microsoft Corporation, "About AutoComplete Name Suggesting," Microsoft Outlook 2003 help forum, located at http://office.microsoft.com/en-us/outlook/HP063766471033.aspx, 2003.

Oberhaus, Kristin, "Look for Cues: Targeting Without Personally Identifiable Information," W3i, LLC blog entry located at http://blog.w3i.com/2009/09/03/looking-for-cues-targeting-without-personally-identifiable-information/, Sep. 3, 2009.

OpenSocial Foundation, "Social Application Tutorial (v0.9)," located at http://wiki.opensocial.org/index.php?title=Social_Application_Tutorial, accessed Oct. 8, 2010.

PCWorld Communications, Inc., "Your Contacts Are Forever: Self-Updating Address Book," located at http://www.pcworld.com/article/48192/your_contacts_are_forever_selfupdating_address_book.html, May 1, 2001.

U.S. Appl. No. 61/407,018, filed Oct. 27, 2010.

W3i, LLC, "Advertiser Feedback System (AFS)," company product description. Sep. 22, 2009.

Wikimedia Foundation, Inc., "Machine Learning," Wikipedia encyclopedia entry located at http://en.wikipedia.org/wiki/Machine_learning, Jan. 30, 2011.

Epstein, "Harnessing User Data to Improve Facebook Features", Doctoral dissertation, Boston College, May 12, 2010.

Hannon et al., "Recommending Twitter Users to Follow Using Content and Collaborative Filtering Approaches", RecSys2010, Sep. 26-30, 2010, Barcelona, Spain.

"OpenSocial Specification v0.9", OpenSocial and Gadgets Specification Group, Apr. 2009.

"The Ultimate Guide for Everything Twitter", Webdesigner Depot, archive.org copy of webpage https://web.archive.org/web/20090325042115/http://www.webdesignerdepot.com/2009/03/the-ultimate-guide-for-everything-twitter/ from Mar. 25, 2009.

European Patent Application No. 10797483.4, extended European Search Report, Dec. 20, 2016.

\* cited by examiner

US 9,954,963 B2

INDEXING AND SEARCHING CONTENT BEHIND LINKS PRESENTED IN A COMMUNICATION

PRIORITY APPLICATION

This application is a continuation of and claims the benefit of U.S. patent application Ser. No. 14/224,446, filed on Mar. 25, 2014, which is a continuation of and claims the benefit of U.S. patent application Ser. No. 12/180,503, filed on Jul. 25, 2008, which claims the benefit of U.S. Provisional Patent Application Ser. No. 60/951,880, filed on Jul. 25, 2007, entitled "Presentation of Personal and Public Data Queried Through Implicit Actions", all of which are hereby incorporated by reference herein in their entirety.

BACKGROUND

Electronic communications between persons for both business and personal use have increased substantially in recent years. In addition to the number of communications increasing, the number of available communication mediums has also increased. In addition to e-mail communications and telephone communications, additional forms of communication have become common in recent years, including instant messaging, social network messaging and commenting, message board posting, text messaging, and Voice Over Internet Protocol (VOiP) communications.

These additional forms of communication have led to individuals exchanging communications with more people than ever before, which leads to an even higher increase in the number of communications sent and received by an individual.

SUMMARY

The present disclosure relates to collecting and presenting historical communication data and/or personal data.

In a first aspect, a computer implemented method includes identifying content in a communication, the content including a link. The method can further include characterizing content associated with the link and storing the characterization. The method can further include, responsive to a user query, presenting one or more of the link, the communication or portion thereof and content associated with the link.

Characterizing content can further include indexing content behind the link and storing an index to the content.

DETAILED DESCRIPTION

Figure 1A:
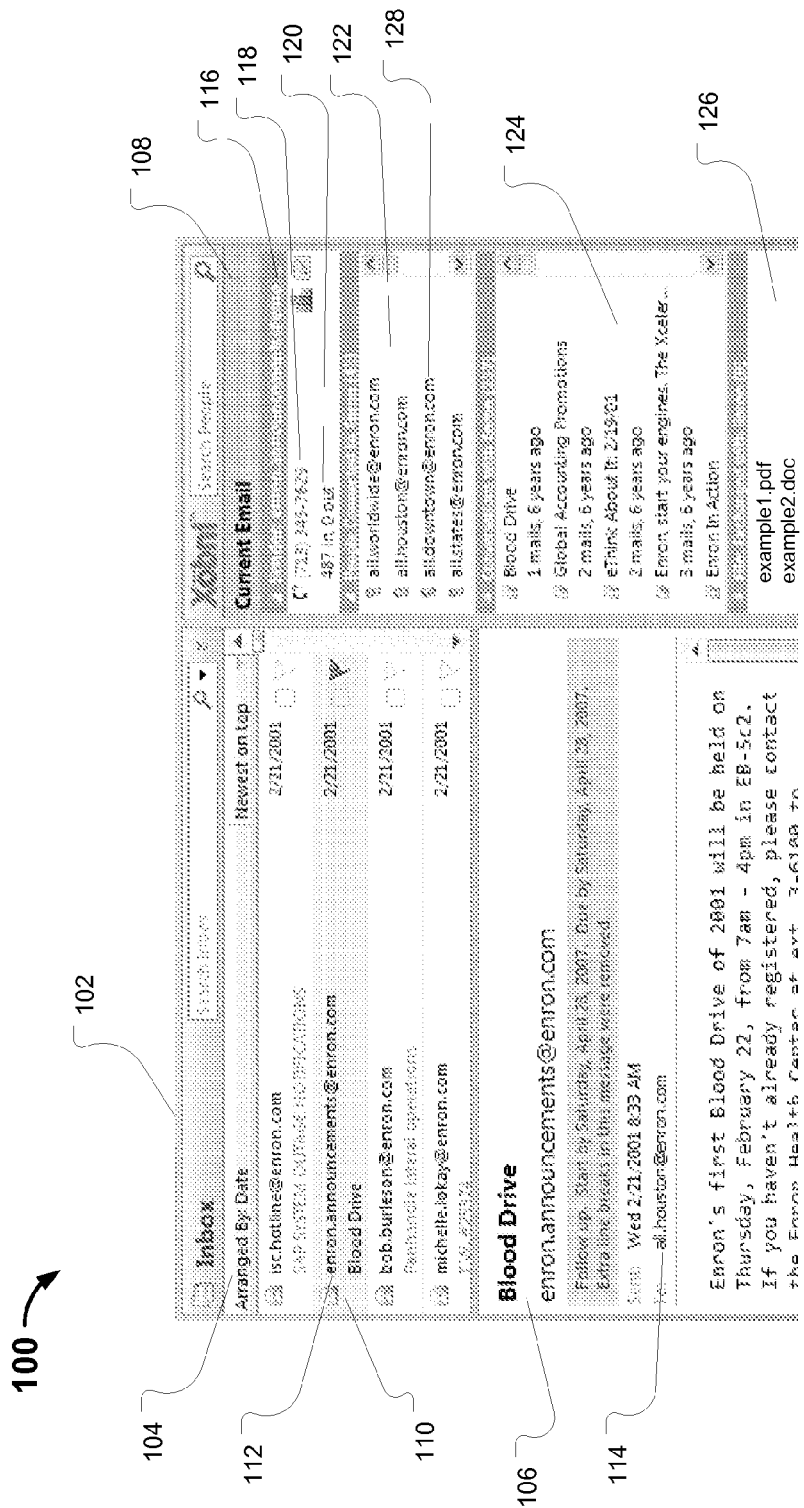
FIG. 1A shows an example e-mail client with a person profile side bar.

FIG. 1A shows an example system 100 for displaying information (e.g., a profile) about communications to, from, and involving an individual. The system 100 includes an e-mail client 102 which can include an inbox viewing panel 104 and an e-mail viewing panel 106. The e-mail client 102 can be a standard stand alone e-mail client such as Microsoft Outlook or Eudora. In an alternate implementation the e-mail client 102 can be a web based e-mail client such as Yahoo! mail or Gmail that is viewed using a web browser. The e-mail client 102 can allow a user to view a list of e-mails in the inbox viewing panel 104. The user can select an e-mail in the inbox viewing panel 104 causing the e-mail client 102 to display the selected e-mail in the e-mail viewing panel 106.

In some implementations, instead of an e-mail client, the system 100 can include an instant messaging client, a social network client, a text message client, or another communication viewing client. It is to be understood that while portions of this description describe systems and methods involving e-mail communications, these same systems and methods can be implemented using other forms of communication, including instant messages, phone calls, text messages, internet message board postings, social network messages or comments, or voice over IP communications.

The e-mail client 102 also includes a profile 108. In the example depicted, the profile 108 is displayed as an additional panel within the e-mail client 102 positioned to the right of the inbox viewing panel 104 and the e-mail viewing panel 106. This additional panel is sometimes referred to as a side bar. In other implementations, the profile 108 can be located at the top, bottom, left side, or any other location within the e-mail client 102. In still other implementations, the profile 108 can be displayed in a stand alone window, in a pop-up bubble displayed over a portion of the e-mail client 102, or integrated as part of one of the other viewing panels displayed by the e-mail client 102. For example, a pop up bubble containing a profile 108 can appear when an e-mail is selected in the inbox viewing panel 104, when an e-mail address or portion of text in the e-mail viewing panel 106 is selected, or when a mouse icon is moved over an e-mail address, name, icon, or portion of text. In another example, information can be integrated as part of the body of an e-mail, such as inserting a picture next to a person's name in the body of an e-mail, or inserting a person's name next to a phone number in an e-mail or attachment.

The profile 108 can contain information relating to a sender of an e-mail, a recipient of an e-mail, the body of an e-mail, an attachment to an e-mail, or a person or topic mentioned in an e-mail. In alternate implementations, the profile 108 can contain information related to a sender, recipient, body, attachment or topic of another communication medium such as an instant message, a phone call, a text message, an internet message board, a social network message or comment, or a voice over IP communication. The user can implicitly request information to be displayed in the profile 108 by selecting an e-mail in the inbox viewing panel 104 or selecting text within a header or body of an e-mail in the e-mail viewing panel 106. In some implementations, the profile can include additional information (e.g., derived information such as search results derived from a topic mentioned in a communication).

In some implementations, the profile 108 can display information about an entity other than a person. For example, a communication may be received from an automated system, such as from a travel website, on-line retailer, an advertising service, or a mailing list. The profile 108 can display information related to the sender of the communication. For example, if the communication received has been sent from a travel website, information related to the travel website, or other communications from the travel website can be displayed. In another example, if the communication received has been sent from an mailing list, information related to the mailing list, or other communications received from the mailing list can be displayed. As yet another example, if the communication received has been sent from a business entity, information about the business entity (e.g., address, telephone number, contact person name) can be included in the personal profile.

For example, the user can select an e-mail 110 in the inbox viewing panel 104 causing the profile 108 to display information related to a sender 112 of the e-mail 110. In another example, the user can select an e-mail address 114 or name of a recipient of the e-mail 110 in order to display information related to the recipient in the profile 108. In another example, the user can select an attachment to the e-mail 110 in order to display information related to the attachment in the profile 108. In yet another example, the user can select the name of a person, a user name of a person, or a particular topic listed in a header, a body, or an attachment of the e-mail 110 in order to display information related to the person or topic in the profile 108.

In some implementations, the system 100 can determine if the user has made an implicit request to view information in the profile 108 by tracking, for example, user input of the form of mouse movements, mouse locations, keyboard strokes, mouse clicks, or active windows. Implicit requests to view information in the profile 108 can include opening, viewing, reading or writing an e-mail or other communication medium. For example, if the user starts to compose an instant message, the profile 108 can display information related to the recipient of the instant message. In another example, if the user views a social network profile, either within the e-mail client 102 or in a separate web browser, the profile 108 can display information related to a person associated with the social network profile.

In some implementations, selecting an e-mail or communication for which a person is a recipient of the e-mail or communication can cause a profile 108 for the person to be displayed. For example, selecting an e-mail addressed to Steve Jones can cause a person profile for Steve Jones to be displayed. In some implementations, selecting an e-mail or communication on which a person has been copied (for example in a CC or BCC field) can cause a profile 108 for the person to be displayed. In some implementations, putting a person's e-mail address in the To, CC, or BCC field of an e-mail or communication can cause a profile 108 for the person to be displayed. In some implementations, hovering a mouse cursor or other selection tool over an e-mail where a person is listed in the To, From, CC, or BCC field can cause a profile 108 for the person to be displayed. In some implementations, typing a person's name can cause a profile 108 for the person to be displayed.

In some implementations, selecting a file that was sent or received as an attachment to a communication can cause a profile 108 to be displayed for a person listed as a recipient or sender of the communication. For example, selecting a file with the name "fourthquarterprogress.doc" that was received as an attachment to an e-mail from Adam Kempf can cause a person profile for Adam Kempf to be displayed. In some implementations, initiating, receiving, or viewing an instant message conversation with a person can cause a profile 108 for the person to be displayed.

In some implementations, receiving a phone call or Voice Over Internet Protocol communication from a person can cause a profile 108 for the person to be displayed. In some implementations, initiating a phone call or Voice Over Internet Protocol communication with a person can cause a profile 108 for the person to be displayed. In some implementations, listening to a voice message or other recorded audio communication involving a person can cause a profile 108 for the person to be displayed. In some implementations, viewing a written transcript of a phone call or other audio communication with a person can cause a profile 108 for the person to be displayed. In some implementations, sending or receiving a text message to or from a person can cause a profile 108 for the person to be displayed. In some implementations, viewing a person's name, contact information, picture or phone number on a cell phone or other mobile device can cause a profile 108 for the person to be displayed.

In some implementations, opening or viewing a webpage which contains a profile for a person can cause a profile 108 for the person to be displayed. For example, viewing Sarah Conrad's Facebook profile page can cause a profile 108 for Sarah Conrad to be displayed. In another example, viewing an employee profile for Samantha Jared on her employer's website can cause a profile 108 for Samantha Jared to be displayed. In another example, viewing Cynthia Burns' YouTube or Flicker profile can cause a profile 108 for Cynthia Burns to be displayed.

In some implementations, opening or viewing a webpage or other document that contains a person's name or other identifying information can cause a profile 108 for the person to be displayed. For example, viewing a website about a charity function that lists Frank Stevens as a volunteer can cause a profile 108 for Frank Stevens to be displayed. In another example, opening a PDF file of an article that lists Jason Rios as an author can cause a profile 108 for Jason Rios to be displayed. In another example, viewing a website that contains a person's screen name can cause a profile 108 for the person associated with the screen name to be displayed. In another example, opening a spread sheet that contains a person's e-mail address can cause a profile 108 for the person associated with the e-mail address to be displayed.

In some implementations, opening or viewing a webpage or other document that contains a name or other identifying information for a person with which the user has communicated or for which the system 100 can display a profile 108, and no other names or identifying information for persons with which the user has communicated or for which the system 100 can display a profile 108, can cause a profile 108 for the person to be displayed. For example, viewing a website about Bill Henderson that does not contain any other person's names can cause a profile 108 for Bill Henderson to be displayed. In another example, a user can view a website about a fishing tournament that lists the participants of the tournament. One of the participants listed can be a person named Jake Byron. If the system 100 is capable of displaying a profile 108 for Jake Byron, but is not capable of displaying a profile 108 for any of the other listed participants, the system 100 can display a profile 108 for Jake Byron in response to the user viewing the website. In another example, a user can open a spread sheet that lists employees of a company. If the user has only exchanged communications with one person listed in the spread sheet, the system 100 can display a profile 108 for the person in response to the opening of the spread sheet.

In some implementations, opening or viewing a webpage or other document that displays a person's name or other identifying information more prominently than the name's or identifying information of other people listed on the webpage or document can cause a profile 108 for the person to be displayed. For example, the user can view an article on a webpage about Jill Anders. The article can contain names of other people that the user has communicated with and for whom person profiles can be displayed. In this example, Jill Anders' name is listed more prominently than the other names, either by being listed in the title of the article, in a larger font than the main portion of the article, in bold, or highlighted in some other manner. Since Jill Anders' name is listed more prominently than the other names listed in the article, the system 100 can determine that a profile 108 should be displayed for Jill Anders rather than for one of the other persons listed in the article. In an example similar to the previous example, Jill Anders' name can be listed more often in the article than any of the other names listed in the article. This can cause the system 100 to determine that a profile 108 should be displayed for Jill Anders rather than for one of the other persons listed in the article. In another example, the user can view a profile for a person with the screen name "guitarguy24". In this example, "guitarguy24" appears at the top of the profile page as a header. The profile also contains names and screen names for other persons with which the user has communicated. The system can determine that a profile 108 associated with the screen name "guitarguy24" should be displayed since "guitarguy24" is displayed in the header of the profile page.

In some implementations, a profile 108 for a person can be displayed in response to the user clicking on or selecting the person's name or other identifying information. For example, the user can view a web page that lists participants in a marathon that includes several persons with which the user has communicated. The user can select one of the names from the list to cause a profile 108 for the selected name to be displayed. In another example, the user can view a list of instant message contacts in an instant message client. The user can select a screen name from the list of instant message contacts to cause a profile 108 for the selected contact to be displayed. In another example, the user can view a document that contains a list of e-mail addresses. The user can select one of the e-mail addresses to cause a profile 108 associated with the selected e-mail address to be displayed. In another example, the user can view a list of a person's social network friends on the person's social network profile. The user can then select a social network profile name from the displayed list of friends to cause a profile 108 associated with the selected social network profile name to be displayed.

In some implementations, opening or viewing a photo or video of a person can cause a profile 108 for the person to be displayed. For example, viewing a photo of Frank Peppers on a picture sharing website can cause a profile 108 for Frank Peppers to be displayed. In another example, viewing a YouTube video that includes footage of Evan Carpenter can cause a profile 108 for Evan Carpenter to be displayed.

In some implementations, opening or viewing a webpage or document that contains subject matter related to a person can cause a profile 108 for the person to be displayed. For example, viewing a webpage for Cornell University can cause a profile 108 to be displayed for one of the user's contacts who attended Cornell University. In another example, viewing a webpage for a company can cause a profile 108 to be displayed for one of the user's contacts who works for the company. In another example, viewing a webpage can cause a profile 108 to be displayed for a person with an e-mail extension that is the same as or similar to the URL of the webpage.

In some implementations, viewing, opening, selecting, clicking on, hovering over, or indicating content created by a person can cause a profile 108 for the person to be displayed. For example, opening a Microsoft Word Document created by Matt Miller can cause a profile 108 for Matt Miller to be displayed, even if the body of the document does not contain Matt Miller's name or any other identifying information about Matt Miller. In another example, viewing a blog written or created by Jennifer Lansing can cause a profile 108 for Jennifer Lansing to be displayed. In another example, selecting a comment posted on a website by Lisa Bunge can cause a profile 108 for Lisa Bunge to be displayed. In another example, selecting a forum post written by Andrew Fenton can cause a profile 108 for Andrew Fenton to be displayed. In another example, hovering a mouse icon over a wall post posted by Dan Hues can cause a profile 108 for Dan Hues to be displayed.

In some implementations, the system 100 can determine if a person is more important than other persons and display a person profile for the more important person. This determination can be based on past user behavior. For example, the user can view an e-mail that is addressed to two persons. In the past, when a person profile for the first person was displayed, the user did not interact with, or showed minimal interaction with, the person profile for the first person. When a person profile for the second person was displayed in the past, the user interacted with the person profile for the second person more than the person profile for the first person. In this example, the system 100 can determine that the second person is more important than the first person and display a person profile for the second person in response to the e-mail addressed to both persons being viewed.

In another example, a first person listed on an e-mail may be the vice president of a company and a second person listed on an e-mail may be the first person's administrative assistant. The system 100 can determine that the first person is more important than the second person based on bibliographic data for each person and display a person profile for the first person in response to the e-mail addressed to both persons being viewed.

In some implementations, the system 100 can insert links or buttons into webpages and documents being viewed by the user. The system 100 can determine if a webpage or document being viewed includes names or other identifying information of any persons with which the user has exchanged communications. The system 100 can then insert a button or link in proximity to the identified names in the webpage or document. For example, if a webpage contains names of three people with which the user has exchanged communication, the system 100 can insert a button next to each of the three names. The user can then click on one of the buttons to cause a profile 108 for the selected person to be displayed. In another example, the system 100 can turn the identified names into hyperlinks instead of inserting buttons. When the user clicks on one of the hyperlinks, the system 100 can display a profile 108 for the selected person. In other implementations, the system 100 can make the identified names selectable in another manner.

In some implementations, the system 100 can be linked to a phone (e.g., voice over IP phone) used by the user. For example, the system 100 can include means for detecting when the user makes or receives a phone call or text message using the phone and display information related to a recipient or initiator of the phone call or text message in the profile 108. In some implementations, the user can make a specific request to view information in the profile 108 by performing a search for a person's name or other identifying information. In some implementations, the system 100 can display more than one person profile in response to any of the above described actions.

In the example depicted in FIG. 1A, the user has selected the e-mail 110 in the inbox viewing panel 104 and header information and a portion of the body of the e-mail 110 is displayed in the e-mail viewing panel 106. The e-mail 110 was received from the sender 112. The system 100 has determined that the user has made an implicit request to view information related to the sender 112 by selecting the e-mail 110. In response to this implicit request, the system 100 displays in the profile 108 information related to the sender 112.

In the example, the information displayed in the profile 108 includes an e-mail address 116, a phone number 118, communication statistics 120, a contact network 122, a conversation list 124, and a files exchanged list 126. In some implementations, the profile 108 can display additional contact information such as name, screen names, social network profile names, social network profile URLs, physical addresses, website URLs, additional e-mail addresses, or additional telephone numbers.

In the example, the communication statistics 120 include the number of e-mails received from the sender 112 and the number of e-mails sent to the sender 112. In other implementations, additional communication statistics 120 can be displayed, including times of communications, dates of communications, types of communications, volume of communications, length of communications, or speed of responses. For example, a statistic for the average amount of time it takes the sender 112 to respond to e-mails sent by the user can be displayed. In another example, the times of day that the sender 112 is most likely to respond to an e-mail or other form of communication can be displayed as a communication statistic 120. In another example, a statistic can be displayed that lists the percentage of communications between the user and the sender 112 that occur using a telephone, the percentage of communications that occur using instant messaging, the percentage of communications that occur using e-mails, or the percentage of communications that occur using a social network website as a percentage of all communications between the user and the sender 112. In another example, the number of communications sent or received on which the sender 112 has been copied can be displayed as a communication statistic 120. In another example, the number of communications received by the user on which the sender 112 has also been listed as a recipient can be displayed as a communication statistic 120.

In some implementations, the communication statistics 120 that are displayed can be chosen by the user. The user can choose to have a default set of communication statistics displayed, or the user can select which individual communication statistics 120 are to be displayed. The user can choose to have the same set of communication statistics 120 displayed for each profile 108 or the user can choose to have a different set of communication statistics 120 displayed depending on which person or topic the currently displayed profile 108 is associated with.

The contact network 122 displayed in the profile 108 shows a list of contacts 128 that are associated with the sender 112. In the example depicted, the contacts 128 are shown as e-mail addresses. In other implementations, the contacts 128 can be listed as names, screen names, nick names, employee numbers, social network profile names, social network profile URLs, telephone numbers, website URLs, or any combination of these.

In some implementations, details about a contact 128 can be displayed adjacent to the contact 128 in the contact network 122. These details can include time since last communication, last form of communication, frequency of communications, total numbers of communications, or other related data.

The contacts 128 listed in the contact network 122 are contacts that are associated with the sender 112. The contacts 128 can include recipients of communications from the sender 112, recipients of communications of which the sender 112 is also a recipient, individuals named in a body or header of a communication with the sender 112, or individuals named in a document that is attached to a communication with the sender 112. For example, a person who was copied on an e-mail between the user and the sender 112 can be listed as a contact 128 in the contact network 122. In the example depicted, the header of the e-mail 110 as shown in the e-mail viewing panel 106 lists all.houston@enron.com as a recipient of the e-mail 110. The contact network 122 lists all.houston@enron.com as a contact 128 of the sender 112. In another example, if the user receives an e-mail from the sender 112 with the subject line "Matt Smith's birthday party", Matt Smith can be listed as a contact 128 in the contact network 122 even if Matt Smith has never been included in or been the recipient of any communications between the user and the sender 112. In another example, if the user posts a comment to a social network profile page belonging to the sender 112 and a person named Eric Johnson has also posted a comment to the social network profile page, or is listed as a friend of the sender 112 on the social network profile page, Eric Johnson can be listed as a contact 128 in the contact network 122.

In some implementations, the contacts 128 listed in the contact network 122 can be collected from sources other than communications between the user and the sender 112. In one implementation, the sender 112 can provide a list of contacts to the user to include in the contact network 122 for the sender 112. The sender 112 can provide the list of contacts to the user through sharing the list of contacts on a shared network, or by sending a communication to the user with, for example, the list of contacts in a body of the communication or in an attachment to the communication.

In some implementations, the system 100 can collect data from outside sources in order to determine contacts 128 to be listed in the contact network 122. The system 100 can query various sources to extract information on contacts that can be associated with the sender 112 and listed in the contact network 122. Sources of information that can be queried to derive contacts associated with the sender 112 can include web search engines, people search engines, social networks, personal web pages, telephone directories, scanned business card data or company website profiles.

For example, the system 100 can perform a search of a social network based on the sender 112's name, e-mail address, screen names or other information about the sender 112. The system can then identify a profile page on the social network belonging to the sender 112. Any contacts that are publicly listed on the social network profile page can be listed in the contact network 122 of the sender 112 even if the user has never communicated with the sender 112 using the social network or viewed the profile page of the sender 112 on this social network. In some implementations, the system 100 can access and extract contacts listed on a private social network profile page belonging to the sender 112 if the user has proper access information or authorization to view the private social network profile page of the sender 112.

In another example, the system 100 can use a search engine to perform a search based on the sender 112's name, e-mail address, screen names or other information about the sender 112 in order to identify web pages that may contain contacts that can be associated with the sender 112. For example, the system 100 can use a search engine to perform a search based on the sender 112's name. If one of the search results returned is for a blog written by a person named Mark Adams that mentions the sender 112, then Mark Adams can be listed as a contact 128 in the contact network 122. In another example, the system 100 can determine that the sender 112 works for the same company as a person who has sent a different communication to the user. This person can then be listed as a contact 128 of the sender 112. In some implementations, the system 100 can collect data using a peer to peer network.

Information that can be used to collect information about contacts 128 or other information displayed in the profile 108 can include e-mail addresses, names, screen names, social network profile names, phone numbers, personal website URLs, social network profile URLs, or physical addresses.

The contacts 128 displayed in the contact network 122 can be listed in order based on a ranking system. Criteria used to rank the contacts 128 can include total volume of communication, volume of communication over a period of time, length of communications, importance level of communications, types of communications, contents of communications, time of communications; methods by which the contacts 128 were determined to be associated with the sender 112, or any combination of these. For example, the contacts 128 can be ranked based on the total number of communications between the user and the sender 112 for which a contact is also a recipient of the communication. In another example, the contacts 128 can be ranked based on the number of communications between the user and the sender 112 for which a contact is also a recipient of the communication over the course of the last three weeks. In another example, the contacts 128 can be ranked based on the number of communications between the user and a contact for which the sender 112 is also a recipient of the communication.

In another example, the contacts 128 can be ranked based on the length of communications between the user and the sender 112 for which a contact is also a recipient of the communication with longer communications being ranked higher than shorter communications. In another example, contacts that are listed on communications flagged as urgent or important can be ranked higher than other contacts. In another example, the user can choose to have contacts who mainly communicate with the user or sender 112 using e-mail ranked higher than contacts who mainly communicate with the user or sender 112 using instant message or social networks. In another example, the system 100 can use the contents of communications involving each contact 128 and the sender 112 to determine if communications involving the contact 128 and the sender 112 are primarily business related or social related communications. The system 100 can then give a higher ranking to contacts associated with business communications than contacts associated with social communications.

In another example, contacts who are associated with more recent communications between the user and the sender 112 can be ranked higher than contacts associated with older communications between the user and the sender 112. In another example, contacts that have been determined to be associated with the sender 112 based on e-mail communication can be ranked higher than contacts that have been determined to be associated with the sender 112 based on web searches.

In some implementations, each contact 128 listed in the contact network 122 can be a link to more information about the contact 128. For example, if a contact 128 is clicked on, selected, or interacted with by the user, a person profile containing information about the selected contact 128 can be displayed. In another example, the user can hover a mouse cursor or other selection tool over a contact 128. This can cause a pop-up bubble containing additional information about the contact 128 to be displayed.

The conversation list 124 can display a list of recent communications between the user and the sender 112 or involving the user and the sender 112. The communications displayed on the conversation list 124 can be a list of past e-mails, text messages, instant messages, telephone calls, social network communications, message board posts or voice over IP communications involving the sender 112. In some implementations, the conversation list 124 can be a list of recent conversation threads involving the sender 112. A conversation thread is a series of communications that can be grouped together. For example, a series of e-mails having the same or similar subjects can be grouped together as a conversation thread. In another example, a group of instant messages between the sender 112 and the user that occurred over a specific period of time can be grouped together as a conversation thread. For example, if the user sent and received a series of instant messages from the sender 112 over a three hour period earlier in the day, and that conversation was separated from another series of instant messages between the user and the sender 112 by a period of 2 hours, the instant messages that were sent and received during that three hour period can be grouped together as a conversation thread. In another example, a series of telephone calls between the user and the sender 112 that occurred during a set time period can be grouped together as a conversation thread.

The communications or conversation threads displayed in the conversation list 124 can be listed in order based on a ranking system. In one implementation, conversation threads can be listed in order of most recent communications to oldest communications. In some implementations, conversation threads can be listed in order of oldest to most recent. In some implementations, conversation threads can be listed in order of importance with conversation threads containing communications marked as urgent being ranked higher than conversation threads with fewer communications marked urgent or no communications marked urgent. In some implementations, the system 100 can determine which conversation threads are work related and which conversation threads are social. The conversation threads that are work related can then be ranked higher than the conversation threads that are social. In some implementations, conversation threads can be ranked based on the number of communications in the conversation thread.

Communications that are listed in the conversation list can include communications initiated by the sender 112, communications for which the sender 112 is a recipient, communications on which the sender 112 has been copied, or communications in which the sender 112 is mentioned.

In the example depicted in FIG. 1A, the conversation list 124 displays a list of recent conversation threads involving the user and the sender 112. The conversation threads displayed are for recent e-mail communications involving the user and the sender 112. The e-mails in each conversation thread are grouped by subject. The conversation list 124 displays the subject for each conversation thread, the number of e-mails in each conversation thread, and the amount of time that has passed since the last communication for this conversation thread was sent or received. In other implementations, additional information can be displayed for each conversation thread, including: time and date of the last communication in the conversation thread, time and date of the first communication in the conversation thread, other contacts involved in the conversation thread, average length of communications in the conversation thread, total number of people involved in the conversation thread, level of importance of the communications in the conversation thread, attachments shared in the conversation thread, calendar events related to the conversation thread, other forms of communication related to the conversation thread, relevant web data, or average response time of communications in the conversation thread.

In some implementations, the conversation list 124 can display a summary or the first few lines of the most recent communication for each conversation list. In some implementations, the conversation list 124 can display a summary or the first few lines of the first communication for each conversation list. In some implementations, the conversation list 124 can display a summary or the first few lines of the last communication initiated by the sender 112 for each conversation list.

The files exchanged list 126 displays a list of files that were attached to communications involving the user and the sender 112. This can include communications initiated by the user for which the sender 112 was a recipient, communications initiated by the sender 112 for which the user was a recipient, or communications initiated by a third party for which the sender 112 and the user were both recipients. The files exchanged list 126 can also include files that were exchanged between the user and the sender 112 without using a communication medium. For example, the files exchanged list 126 can include files that were transferred from the sender 112's network drive to the user's computer or network drive. In another example, the files exchanged list 126 can include files that were transferred to the user's computer or network drive from an external hard drive, flash drive, or floppy disk belonging to or populated by the sender 112.

The files displayed in the files exchanged list 126 can be listed in order based on a ranking system. In one implementation, files can be listed in order of most recently received files to least recently received files. In some implementations, files can be listed in order of oldest to most recent. In some implementations, files can be listed in order of importance, with files that were attached to communications marked as urgent being ranked higher than files attached to communications that were not marked as urgent. In some implementations, the system 100 can determine which files are work related and which files are personal. The files that are work related can then be ranked higher than the files that are personal. In some implementations, files can be ranked based on the size of the files.

In some implementations, the files displayed in the files exchanged list 126 can be grouped together. The files can be grouped together based on the subject of the communications to which the files were attached, file name, file title, date of the file, date of the communication, file type, or subject matter of the file. For example, if a document has undergone several rounds of revisions, the different versions of the document can be grouped together so that the different versions of the document can be easily compared to one another. In another example, a number of files about rain forests can be grouped together since they all contain related subject matter. In another example, all image files can be grouped together so that they can be more easily viewed, or easily put into a slide show. For example, a group of image files can be displayed as a slide show and each slide can contain additional information about the image being displayed, such as who sent the image, recipients of the image, the date the image was sent or received, or other information drawn from one or more communications to which the image was attached.

Figure 1B:
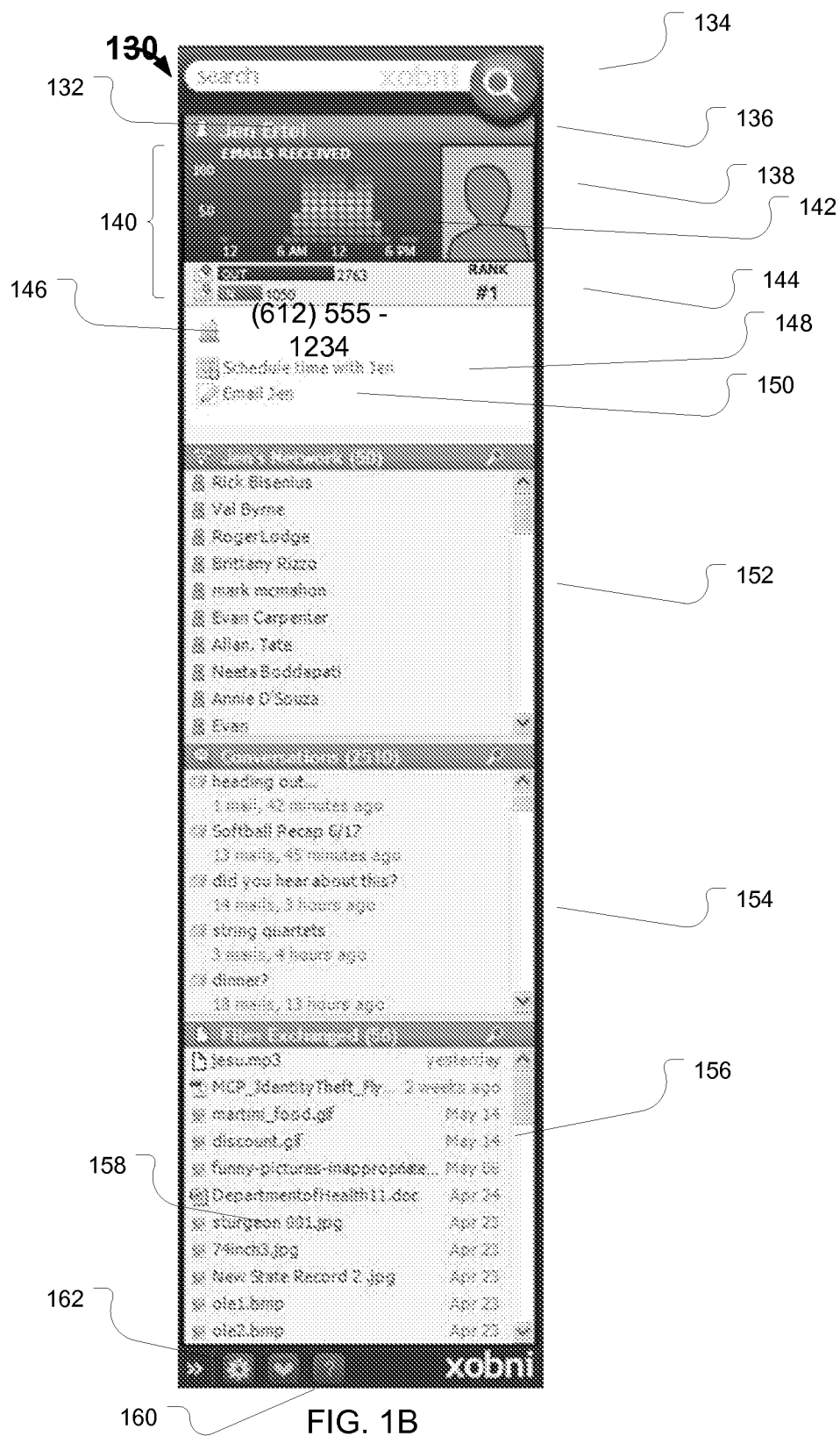
FIG. 1B shows an example of a person profile.

FIG. 1B shows a profile 130 for a person 132 named "Jen Ertel". The profile 130 for the person 132 can be displayed in response to an action by a user that indicates either an implicit or direct request to view the profile 130 of the person 132. Actions by the user that can cause the profile 130 for the person 132 to be displayed can include viewing or selecting a communication sent by the person 132, viewing or selecting a communication for which the person 132 is listed as a recipient, composing or initiating a communication with the person 132, selecting or clicking on a name, screen name, or e-mail address of the person 132, or performing a search for information related to the person 132.

The profile 130 includes a search bar 134. The search bar 134 can be used to request that information be displayed about a particular person, topic, conversation thread, communication, or file. For example, a search performed using the search bar 134 and the search string "Allan Tate" can result in a person profile for a person named Allan Tate being displayed. In another example, a search using the search string "sunday_presentation.ppt" can result in information about a file named "sunday_presentation.ppt" being displayed. In another example, a search using the search string "2002 Sales Goals" can result in information to be displayed regarding communications with the subject "2002 Sales Goals", containing the phrase "2002 Sales Goals", or having attachments that contain the phrase "2002 Sales Goals".

Search criteria that can be used to identify a person profile can include names, screen names, social network profile names, social network profile URLs, physical addresses, website URLs, e-mail addresses, e-mail subject lines, file names, or telephone numbers. For example, a search using the search string "allan.tate@example.com" can result in a person profile for a person named "Allan Tate" being displayed. In the example depicted in FIG. 1B, a search for the phone number "(612) 555-1243" may have been performed in-order to display the profile 130 for the person 132 named "Jen Ertel".

The profile 130 can include a title bar 136. The title bar 136 can display a name, a nick name, a screen name, a primary e-mail address, or other identifying title for the person 132 so that the user can easily identify who the information in the profile 130 is related to.

The profile 130 can also include an image 138. The image 138 can be a picture of the person 132 to help the user more easily identify who the information in the profile 130 is related to or to help the user identify whom he or she is communicating with. For example, if the user receives an instant message from a person with the screen name "summergirl" the user may not be able to remember who this screen name belongs to. When the instant message is received, the profile 130 can display information about the person with the screen name "summergirl" including a picture of the person as the image 138. This can help the user to identify whom he or she is communicating with. The image 138 can also be an image, icon, or picture associated with the person 132. The image, icon, or picture can be used to identify the person 132 as a business contact, co-worker, friend, social acquaintance, client, or contractor. For example, all of the person profiles 130 for contacts from a particular company can display a logo for that company. This can help the user to quickly identify what relationship he or she has with these particular contacts.

The image 138 can be added to the profile 130 by the user, or it can be automatically extracted from a communication with the person 132 or from a website or profile page belonging to or about the person 132. For example, if a social network screen name or URL for the person 132 is known, an image from the person 132's social network profile page can be extracted and used as the image 138. In another example, if instant message communications with the person 132 include an icon that identifies the person 132, this instant message icon can be extracted and used as the image 138.

The profile 130 can include communication statistics 140 about communications involving the person 132. These communication statistics 140 can include the statistics as previously described for FIG. 1A. In the example shown in FIG. 1B, one of the communication statistics 140 displayed is a graph 142 showing what times of day communications are received from the person 132 and the relative volume received from the person 132 at each time of day. This can help the user to determine when, or how quickly the person 132 will respond to a new communication from the user. For example, if the user lives in the United States and the person 132 lives in Germany, most of the communications received from the person 132 may occur between 5:00 am and 10:00 am of the user's local time. The graph 142 can easily display this information so that the user can determine when to reasonably expect a response to a recent communication from the person 132.

Other communication statistics 140 displayed in the profile 130 in FIG. 1B include the total number of communications received from the person 132, the total number of communications sent to the person 132, and a rank 144. The rank 144 can be the rank of the person 132 compared to all other persons that the user communicates with. The rank 144 can be based, for example, on total communications exchanged, total number of attachments exchanged, total number of communications sent, total number of communications received, length of communications or importance of communications.

Communication statistics 140 can be displayed as graphs or charts as shown in FIG. 1B, or as text. In some implementations, statistics can be displayed in the profile 130 or in an additional panel or pop-up window as "fun facts". For example, when viewing a person profile for someone named "Matt Miller", the person profile can display a message that reads "Matt's birthday is next week". In another example, a pop-up bubble with the message "Your last communication with Matt was 21 days ago" can be displayed. In another example, a panel can display a message reading "You send Matt 20 times as many messages as he sends you."

Another example of a fun fact that can be displayed is "Matt is your $5^{th}$ most e-mailed contact". Another example of a fun fact that can be displayed is "your most e-mailed contact is Steve.". Another example of a fun fact that can be displayed is "the fastest responder to your communications is Garrett." The fun facts can include any combination of communication statistics, communication information, contact information, or contact statistics.

In some implementations, communication statistics 140 can be shared with other persons. For example, the user can choose to share communication statistics with the person 132. The person 132 will then be able to view communication statistics 140 about his or her communications with the user. In some implementations, the user can indicate that one or more persons are trusted contacts. Communication statistics 140 can be automatically shared with all persons indicated as trusted contacts. Other information, such as calendar information, contact information, or contact network information can also be shared with trusted contacts.

The profile 130 can include contact information 146. The contact information 146 displayed can include e-mail addresses, telephone numbers, screen names, social network profile names, social network profile URLs, physical addresses, facsimile numbers, or website URLs. The contact information 146 can be collected from a variety of sources including communications between the person 132 and the user, communications between the user and other persons, e-mail body text, e-mail meta data, e-mail header information, e-mail attachments, web search engines, people search engines, social networks, e-mail clients, instant messages, personal web pages, telephone directories, scanned business card data, text messages, picture sharing websites, video sharing websites, personal profile pages, telephone communications, or customer relationship management systems. For example, when the user receives an e-mail from a person, that person's e-mail address can be added to the list of contact information 146 for that person's profile 130. In another example, when the user makes a phone call to a person, that person's telephone number can be added to the list of contact information 146 for that person's profile 130.

In some implementations, contact information 146 can be extracted from the body, subject, or meta data of a communication between the user and the person 132. For example, if the user receives an e-mail from the person 132 with a signature block at the end that includes a telephone number, facsimile number, and screen name for the person 132, this contact information can be extracted from the e-mail and added to the list of contact information 146 for the person 132's profile 130. In another example, an e-mail from a person can include an address for the person in the body of the e-mail or in an attachment to the e-mail, this address can be extracted from the e-mail or attachment and added to the list of contact information 146 for that person's profile 130. In another example, the person 132 can leave a social network post for the user telling the user the person 132's instant message screen name, this screen name can be added to the list of contact information 146 for the person 132's profile 130.

In some implementations, contact information 146 for the person 132 can be extracted from a communication from a third party. For example, the user can receive an e-mail from Bill that contains the text "Mary's cell phone number is 608-555-5353". This phone number can be extracted from Bill's e-mail and added to the list of contact information 146 for Mary's profile 130. In another example, the user can receive an e-mail with an attachment that contains a list of telephone numbers, e-mail addresses, and office numbers for everyone in the user's office. The telephone number, e-mail address, and office number for each person listed on the attachment can be extracted and added to the list of contact information 146 for the person profiles 130 of each person listed on the attachment.

Contact information 146 can be extracted from multiple sources, including multiple e-mail clients, multiple web mail systems, multiple instant message clients, multiple telephone numbers, multiple social networks, or multiple web pages.

In some implementations, contact information 146 can be collected using search engines, telephone directories, or people search engines. Search criteria can include e-mail addresses, names, screen names, social network profile names, phone numbers, personal website URLs, social network profile URLs, facsimile numbers or physical addresses. For example, a search of a telephone directory or people search engine for "Rex Banner" can return a telephone number for Rex Banner. This telephone number can then be added to the list of contact information 146 for Rex Banner's profile 130. In another example, a people search or web search for the e-mail address "alewis@example.com" can return a URL for a social network profile for Adam Lewis. The name "Adam Lewis" can then be associated with the e-mail address "alewis@example.com" in a profile 130. In addition, the social network profile URL and social network screen name for Adam Lewis can be added to the list of contact information 146 for Adam Lewis's profile 130. Furthermore, additional contact information, that is listed on the social network profile for Adam Lewis, such as additional e-mail addresses, phone numbers, instant message screen names, etc., can be extracted from the social network profile and added to the list of contact information 146 for Adam Lewis's profile 130.

In another example, a web search or person search for a person can return a photo or video sharing website profile for the person. The URL or screen name for the person's photo or video sharing website profile can be added to the list of contact information 146 for the person's profile 130. In addition, the photo or video sharing website may contain additional contact information for the person that can be extracted and added to the list of contact information 146 for the person's profile 130.

In another example, contact information 146 for the person 132 can include an e-mail address "jertel@examplecompanyltd.com". A web search can be performed to identify the website associated with the e-mail extension "exam plecompanyltd.com". For example, this e-mail extension can be associated with a company called "Example Company ltd." The website for Example Company ltd. can then be searched for information about the person 132. The website may include a profile page for the person 132 that includes contact information that can be added to the list of contact information 146 for the person 132's profile 130. In addition, the URL for the profile page can be added to the list of contact information 146 for the person 132's profile 130.

In some implementations, the address for a person can be used to refine the search results for that person by constricting the results to information about persons in a specific geographic area. For example, if a search is being performed for information on a person with a common name, such as "Bill Johnson", and Bill Johnson's address is known, the search results can be refined by restricting the results to information about person's named Bill Johnson in the city of the known address. In some implementations, other information about a person can be used to refine search results for that person.

In some implementations, contact information can be extracted from a shared network drive or through a secure connection. In some implementations, contact information can be automatically shared between systems. For example, the person 132 can elect to share contact information with all people in a trusted network, such as all people with e-mail extensions from the same company. A computer belonging to the person 132 can then automatically send contact information to all trusted people. If the user is in the network of trusted people, the person 132's contact information will automatically be shared with a computer or system belonging to the user.

In some implementations, contact information for the person 132 can be manually added or removed from the profile 130 by the user. In some implementations, contact information for the person 132 can be manually added or removed from the person profile by the person 132 or by a third party. In some implementations, the user can choose which contact information for each person is displayed in that person's person profile.

In some implementations, when a mouse cursor or other selection tool is hovered over/indicates a piece of contact information in the list of contact information 146, a pop-up bubble or other indicator can be displayed which indicates the source from which the piece of contact information was received or extracted. For example, if a phone number has been extracted from an e-mail, a hover bubble can be displayed which shows the e-mail or a portion of the e-mail where the phone number was extracted with the extracted info highlighted or demarcated in some way.

In some implementations, the user can be allowed to validate contact information in the list of contact information 146. Validated contact information can be indicated as validated, and un-validated contact information can be indicated as un-validated. For example, if a phone number for the person 132 is extracted from an e-mail, the user can look at the phone number to determine if it is indeed the correct phone number for the person 132. If the user believes that the phone number is correct, the user can choose to validate the phone number. The phone number can then be displayed along with an indication that it has been validated, such as with a check mark icon, or text that reads "valid". If the user is unsure if the phone number is correct, or has not taken the time to validate the phone number, the phone number can be displayed with an indication that it has not been validated, such as with a question mark icon, or the text "not validated".

In some implementations, presence of the person 132 can be indicated for some or all of the contact information on the list of contact information 146. For example, an indicator next to a person's instant message screen name can indicated if the person is currently logged onto the related instant message network. In another example, an indicator next to a person's social network screen name or URL can indicate if the person is currently logged onto the related social network or if the person has made a recent update to his or her social network profile. In another example, an indicator next to a person's e-mail address can indicate if the person has put up an away message or out of the office message.

In some implementations, the profile 130 can display information about the person 132's current location. If the person 132 is in possession of a GPS unit, GPS enabled phone, or other location detection device, the person 132 can choose to share his or her location information. There are several services that allow a person to share location information with other people. The person 132 can choose to share his or her location information with the user. The profile 130 can then display the current location of the person 132. This location information can be displayed as an address, map coordinates, or a graphic of a map with an icon to indicate the person 132's present location.

Other information about the person 132 that can be displayed on the profile 130 can include birthday, gender, age, job title, employer, universities attended, family information, or other biographical data. Information from Customer Relationship Management Systems (CRMs) about or related to the person 132 can also be displayed in the profile 130. Information about calendar items or scheduled meetings related to the person 132 or related to a communication can also be displayed as part of the profile 130.

In some implementations, information from one or more websites can be displayed as a chronological feed of information in the profile 130. This information can be queried on the web via one or more search engines or from one or more specific websites through established associations between the person 132 and the one or more websites. For example, this information can be found by general searching, people searching, or querying websites where it has been established that the person 132 is generating content or is the subject of content on the website. Search terms for these searches can include e-mail addresses, names, screen names, social network profile names, phone numbers, personal website URLs, social network profile URLs, or physical addresses. Information that is extracted from communications with the person 132 can also be used as search criteria.

The profile 130 can include a schedule time link 148. The user can click on/interact with the schedule time link 148 to send a communication to the person 132 to request a meeting or to send the user's schedule to the person 132. For example, clicking on the schedule time link 148 can cause an e-mail to be automatically composed that is addressed to the person 132 that contains all of the times over the course of the next week that the user is available during business hours. This schedule information can be extracted from a calendar associated with an e-mail client, web mail account, social network account, instant messaging program, telephone, personal digital assistant (PDA), or website belonging to the user or associated with the user. In addition, schedule information can be extracted from a calendar stored on a computer, network drive, or other data storage location belonging to or associated with the user. In one implementation, clicking on the schedule time link 148 can cause a communication to be sent to the person 132 requesting schedule information from the person 132.

The profile 130 can also include one or more initiate communication links 150. In the example shown in FIG. 1B, the initiate communication link 150 displayed will cause an e-mail addressed to the person 132 to be automatically generated when it is clicked on. Other forms of communication that can be initiated using an initiate communication link 150 include telephone calls, instant messages, text messages, social network messages, social network posts, message board posts, facsimiles, or voice over IP communications. For example, the profile 130 can include a "call Jen" link that can cause the user's cell phone to dial Jen's phone number when clicked on. In another example, the profile 130 can include an "instant message" link that when clicked on, can cause an instant message program to automatically open and generate an instant message addressed to a screen name of the person 132.

The profile 130 can include a contact network 152. The contact network 152 can include a list of contacts associated with the person 132. The contact network 152 can be populated using the methods previously described in the description of FIG. 1A. The profile 130 can also display the total number of contacts associated with the person 132 in the contact network 152. In the example shown in FIG. 1B, the contact network 152 displayed in the profile 130 indicates that there are 50 contacts in Jen's contact network 152.

Clicking on, selecting, or interacting with one or more contacts from the contact network 152 can cause one or more actions to occur. In one implementation, selecting a contact from the contact network 152 can cause a person profile for that contact to be displayed. In some implementations, selecting one or more contacts from the contact network 152 can cause a communication directed to the selected contacts to be initiated. For example, selecting three contacts from the contact network 152 can cause an e-mail addressed to the three contacts to be generated. In another example, clicking on three contacts from the contact network 152 can cause the user's telephone to initiate a conference call with the selected contacts. In some implementations, selecting one or more contacts from the contact list can cause a communication directed to the selected contacts and the person 132 to be generated.

In other implementations, selecting a contact from the contact network 152 can cause the most recent communication or conversation thread between the user and the selected contact to be displayed. In some implementations, selecting a contact from the contact network 152 can cause the most recent communication or conversation thread involving the contact, the person 132, and the user to be displayed. In some implementations, moving a mouse cursor over a contact in the contact network 152 can cause information about the contact to be displayed. For example, moving a cursor over a contact can cause a small pop-up bubble to appear that displays the contact's phone number, e-mail address, or other contact information. In some implementations, contacts can be manually added or removed from the contact network 152 by the user.

The profile 130 can include a conversation list 154 that includes a list of recent communications or conversation threads involving the user and the person 132 as previously described in the description of FIG. 1A. The conversation list 154 can display the total number of communications or conversation threads involving the user and the person 132. In the example shown in FIG. 1B, the conversation list 154 indicates that 2510 conversation threads have occurred that involved the user and the person 132.

Clicking on or selecting a conversation thread or communication in the conversation list 154 can cause a more detailed summary of the conversation thread or communication to be displayed. For example, selecting a conversation thread can cause a summary of one or more communications in the conversation thread to be displayed. In another example, selecting a communication in the conversation list 154 can cause a summary of the communication to be displayed. In some implementations, selecting a communication in the conversation list 154 can cause the communication to be displayed. For example, selecting an e-mail from the conversation list 154 can cause the e-mail to be displayed.

In some implementations, selecting a conversation thread can cause the most recent communication to be received or the most recent communication to be sent in that conversation thread to be displayed. In some implementations, selecting a conversation thread in the conversation list 154 can cause the first communication in that conversation thread to be displayed. In some implementations, selecting a conversation thread from the conversation list 154 can cause a communication addressed to all of the participants of the conversation thread to be generated. For example, selecting an e-mail conversation thread can cause an e-mail to be automatically generated that is addressed to all of the e-mail addresses involved with the selected conversation thread.

In some implementations, selecting a conversation thread can cause a person profile for the initiator of the first communication in the conversation thread to be displayed. The person profile can be similar to the profile 130 in FIG. 1B. In some implementations, selecting a conversation thread can cause a person profile for the initiator of the most recent communication in the conversation thread to be displayed. In some implementations, selecting a conversation thread can cause a person profile for the initiator of the most communications in the conversation thread to be displayed. In some implementations, selecting a conversation thread can cause a person profile for the recipient of the most recent communication in the conversation thread to be displayed.

In some implementations, selecting a conversation thread can cause a person profile for a person associated with one or more communications in the conversation thread to be displayed. For example, a person profile can be displayed for a person who is listed in the To, From, CC, or BCC field in one or more of the communications in a conversation thread when the conversation thread is selected. In another example, a person profile can be displayed for a person who is listed in a communication or an attachment to a communication in a conversation thread when the conversation thread is selected. In some implementations, multiple person profiles can be displayed for multiple persons associated with one or more communications in a conversation thread when the conversation thread is selected.

In some implementations, communications or conversation threads can be manually added or removed from the conversations list 154 by the user.

The profile 130 can include a files exchanged list 156. The files exchanged list 156 can contain a list of files exchanged between the user and the person 132 as previously described in the description of FIG. 1A. For each file listed in the files exchanged list 156, the profile 130 can display a file name, a file title, an icon, the time or date when the file was received, the amount of time that has elapsed since the file was received, the subject of the communication to which the file was attached, or other information about the file. Icons displayed next to a file name or file title can indicate what type of document the file is. In the example depicted, a file 158 with the file name "sturgeon 001.jpg" is displayed. An icon next to the file name for the file 158 indicates that the file 158 is a picture file. A date next to the file name indicates that the file 158 was received on April 23.

Clicking on or selecting a file in the files exchanged list 156 can cause the file to open. In some implementations, selecting a file can cause the communication to which the file was attached to be displayed. In some implementations, selecting a file can cause a list of files with the same file name to be displayed. This allows the different versions of a document that has undergone several rounds of revisions to be reviewed and compared to each other. In some implementations, selecting a file can cause a summary of the file to be generated and displayed. For example, hovering a cursor over a file in the files exchanged list 156 can cause an information bubble containing the title and first few lines of the file to be displayed. This list of files can include a time and date stamp for each version of the file so that the most recent revision can be easily identified. In some implementations, files can be copied from the files exchanged list 156 to other locations. In some implementations, files can be manually added or removed from the files exchanged list by the user.

The profile 130 can include one or more menu buttons 160. The menu buttons can be used to change personal settings or preferences, change viewing preferences, or access menus or help information. The profile 130 can also include a minimize button 162 that can cause the profile 130 to minimize or close. When the minimize button 162 is clicked or selected, a minimized version of the profile 130 that takes up less space in a viewing window can be displayed. The minimized version of the profile 130 can include a summary of some or all of the information displayed by the profile 130.

In some implementations, the profile 130 can contain weather information. For example, the person profile can display current weather information for the location of the person 132 based on one or more addresses for the person 132. The weather information can be displayed as text or as one or more graphics.

Figure 1C:
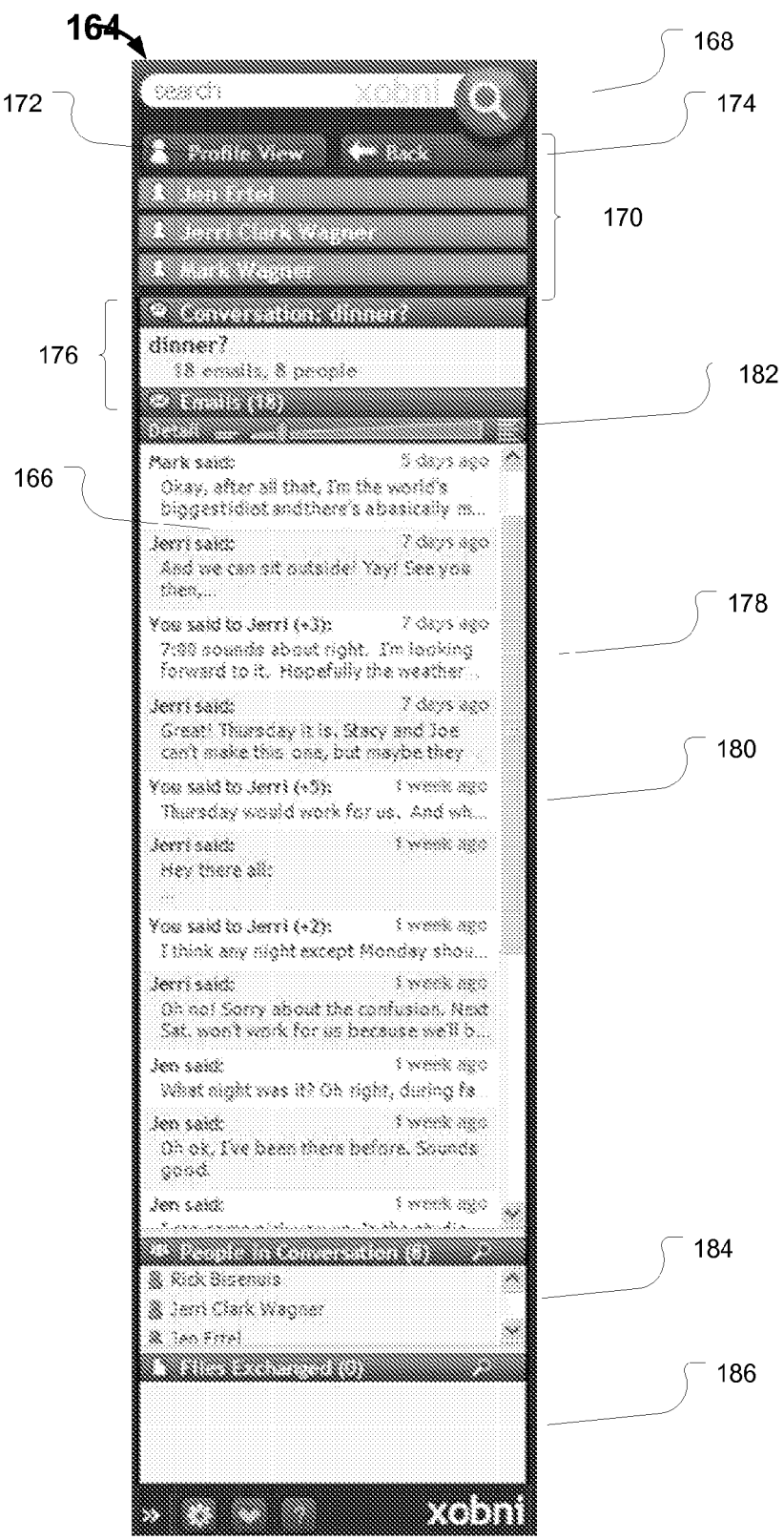
FIG. 1C shows an example of a conversation thread profile.

FIG. 1C shows a viewing panel 164. The viewing panel 164 can display a person profile such as the profile 130 of FIG. 1B. The viewing panel 164 can also display information about communications, communication attachments, files, or conversation threads. In the example shown in FIG. 1C the viewing panel 164 displays information about a conversation thread 166. The information about the conversation thread 166 can be displayed in response to a user clicking on a conversation thread 166 in a conversation list, such as the conversation list 154 from FIG. 1B. In some implementations, the conversation thread 166 can be displayed in response to the user viewing, reading, selecting, opening, writing, initiating, or receiving a communication that is part of the currently displayed conversation thread 166. For example, the user can select an e-mail such as the e-mail 110 from FIG. 1A. This can cause a communication profile containing information about the conversation thread 166 that includes the selected e-mail to be displayed. The communication profile can include information about the selected e-mail as well as other e-mails and communications involved in the same conversation thread 166 as the selected e-mail.

In another example, the user can view an instant message which can cause information about a conversation thread 166 which includes the instant message to be displayed. In another example, the user can receive a phone call that is a continuation of a conversation thread 166. This can cause a communication profile containing information about the conversation thread 166 that includes the received phone call to be displayed. In another example, the user can compose an e-mail that is a continuation of a conversation thread 166. This can cause a communication profile containing information about the conversation thread 166 that includes the e-mail to be displayed.

In some implementations, the conversation thread 166 can be displayed in response to a search performed by the user. For example, the user can use a search bar 168 to search for a conversation thread 166 based on the subject of the conversation thread 166, participants in the conversation thread 166, files attached to communications in the conversation thread 166, or key words or terms in the communications of the conversation thread 166.

The viewing panel 164 can include one or more navigation buttons 170. The navigation buttons 170 can include a profile view navigation button 172. The profile view navigation button 172 can be used to return the viewing panel 164 to a profile view so that the viewing panel 164 displays information about the sender or recipient of a currently selected communication, or another person as indicated by the user. The navigation buttons 170 can also include a back button 174. The back button 174 can be used to display a person profile, conversation thread, or other information that was previously displayed in the viewing panel 164. For example, if the user was previously viewing a person profile for a person named Mark Wagner, clicking on the back button 174 can cause the viewing panel 164 to display the person profile for Mark Wagner. In another example, if the user was previously viewing information about an e-mail attachment, clicking on the back button 174 can cause the viewing panel 164 to display the previously viewed e-mail attachment information.

The navigation buttons 170 can also display a navigation history that has lead to the current information being displayed in the viewing panel 164. In the example shown in FIG. 1C, the navigation buttons 170 indicate that the user first viewed a person profile for Jen Ertel. The user then viewed a person profile for Jerri Clark Wagner. The user may have opened the person profile for Jerri Clark Wagner by clicking on the name Jerri Clark Wagner in a contact network or list of contacts on Jen Ertel's person profile, or by performing a search for Jerri Clark Wagner, or other information associated with Jerri Clark Wagner. The navigation buttons 170 indicate that the user then viewed a person profile for Mark Wagner. The user may have caused the current conversation thread 166 to be displayed by clicking on a conversation thread in a conversation list similar to the conversation list 124 from FIG. 1A. In some implementations, clicking on or selecting any of the buttons in the navigation history can cause the viewing panel 164 to display the person profile, conversation thread, communication, communication attachment, or other information associated with the selected navigation button 170.

The viewing panel 164 can include a title bar 176. The title bar 176 can include the type of information being displayed in the viewing panel, the subject, and other key information. When the information being displayed in the viewing panel 164 is a conversation thread 166, the title bar 176 can indicate that a conversation is being viewed, the title or subject line of the conversation thread, the number of communications involved in the conversation thread, the types of communications involved in the conversation thread, or the number of people involved in the conversation thread. In the example shown, the title bar 176 indicates that a conversation is being viewed, that the subject line of the communications in the conversation thread 166 is "dinner?", that there are 8 people involved in conversation thread 166, that 18 communications are included in the conversation thread 166, and that all 18 communications are e-mails.

The viewing panel 164 can include a summary of some or all of the communications 178 that make up the conversation thread 166. Information displayed as part of the summary for each communication 178 can include the sender of the communication 178, the recipients of the communication 178, the time or day that the communication 178 was sent or received, attachments to the communication 178, the first few lines or sentences of the communication 178, the importance of the communication 178, or the number of recipients of the communication 178. For example, an e-mail summary 180 indicates that the user sent an e-mail in response to an e-mail from Jerri 1 week ago and that 5 additional recipients were also listed on the e-mail. The e-mail summary 180 also displays the first lines of the e-mail sent to Jerri.

In some implementations, the communications 178 that make up the conversation thread 166 can be of various communication types. For example, a conversation thread can include a combination of e-mails, instant messages, and social network profile comments. In another example, a conversation thread can include a combination of phone conversation transcripts, text messages, and blog posts.

In some implementations, clicking on or selecting a communication summary in the conversation thread 166 can cause the related communication to be displayed. For example, clicking on the e-mail summary 180 can cause the e-mail sent from the user to Jerri to be displayed. In another example, selecting a communication summary in the conversation thread 166 can cause a person profile for a sender or one or more recipients of the related communication to be displayed. In another example, selecting a communication summary in the conversation thread 166 can cause one or more attachments or a list of attachments to the related communication to be displayed. In some implementations, selecting a communication summary in the conversation thread 166 can cause a communication addressed to the sender or one or more recipients of the related communication to be automatically generated. In some implementations, selecting a communication summary in the conversation thread 166 can cause a more detailed summary for the related communication to be displayed. In some implementations, selecting a communication summary in the conversation thread 166 can cause a communication profile containing information about the communication to be displayed.

The viewing panel 164 can include a detail adjustment control 182. The detail adjustment control 182 can be used to modify the amount of detail that is displayed in each communication summary in the conversation list 166. In one implementation, adjusting the detail adjustment control 182 can increase or decrease the number of words or lines of a body of a communication that are displayed in each communication summary. In some implementations, adjusting the detail adjustment control 182 can increase or decrease the amount of information that is displayed for each communication summary. For example, the detail adjustment control can be changed to display an e-mail address and phone number for each sender or recipient of each communication 178 in the corresponding communication summary. In another example, the detail adjustment control 182 can be used to control what information is used to identify senders or recipients of communications 178 in each communication summary. Information used to identify senders or recipients can include names, nick names, screen names, e-mail addresses, telephone numbers, social network profile names, or company names.

In some implementations in which some or all of the communications that make up a conversation thread 166 are telephone calls or voice over IP communications, audio recordings of some or all of the telephone calls or voice over IP communications can be displayed in the conversation thread 166. Clicking on or selecting a telephone call or voice over IP communication in the conversation thread 166 can cause an audio recording of the communication to play. In some implementations, automatically or manually created transcripts of telephone calls or voice over IP communications that make up part or all of a conversation thread 166 can be displayed. In some implementations, a summary of a transcript of the audio communication can be displayed as part of a communication summary in the conversation thread 166. Clicking on or selecting a communication summary of a telephone call or voice over IP communication for which a transcript exists can cause the full transcript of the audio communication to be displayed, or an audio file of the audio communication to play.

The viewing panel 164 can include a conversation participants list 184. The conversation participants list 184 can be a list of senders and recipients of the communications 178 that make up the conversation thread 166. Information about each participant in the conversation thread 166 can be displayed, including name, contact information, number of communications initiated in the displayed conversation thread 166, and other relevant information. The conversation participants list 184 can also indicate the total number of participants involved in the conversation thread 166.

In some implementations, clicking on or selecting a person listed in the conversation participants list 184 can cause a person profile for the selected person to be displayed. In some implementations, selecting a person from the conversation participants list 184 can automatically generate a communication addressed to the selected person. In some implementations, selecting a person from the conversation participants list 184 can cause all communications or summaries of communications from the current conversation thread 166 that were initiated by the selected person to be displayed.

The viewing panel 164 can include a files exchanged list 186. The files exchanged list 186 can display a list of files that have been exchanged in the current conversation thread 166. For example, the files exchanged list 186 can list all of the files that have been attached to communications 178 in the conversation thread 166. Clicking on or selecting a file from the files exchanged list 186 can cause the selected file to open. In some implementations, selecting a file from the files exchanged list 186 can cause one or more communications to which the file was attached to be displayed. In some implementations, selecting a file from the files exchanged list 186 can cause one or more communication summaries for communications to which the file was attached to be displayed.

In some implementations, the viewing panel 164 can include web information derived from links in one or more of the communications 178 in the conversation thread 166. For example, one of the communications 178 can contain a link to a website for a restaurant. Information about the restaurant, such as hours of operation, address, daily specials, or type of food can be displayed in the viewing panel 164. In another example, a communication 178 in the conversation thread 166 can contain a link to a document that contains information about an upcoming meeting. Information about the meeting, such as meeting time, location, or agenda items can be displayed in the viewing panel 164. In another example, one of the communications 178 can contain a link to a website for a concert. Information about the concert, such as date, time, location, and artists performing, can be displayed in the viewing panel 164.

In some implementations, the viewing panel 164 can include information derived from a file attached to one or more of the communications 178 in the conversation thread 166. For example, if a file containing information about a birthday party is attached to one of the communications, information about the birthday party, such as name of the person who's birthday it is, date, time and location can be displayed in the viewing panel 164.

In some implementations, addresses or maps of locations listed in one or more of the communications 178 or in one or more files attached to one or more of the communications 178 can be displayed. For example, if an address is listed in one of the communications 178, the address can be displayed in the viewing panel 164. In another example, if an address is listed in one of the communications 178, a map of the address can be displayed in the viewing panel 164. In another example, if a city is listed in an attachment to one of the communications 178, a map of the city can be displayed in the viewing panel 164.

Figure 1D:
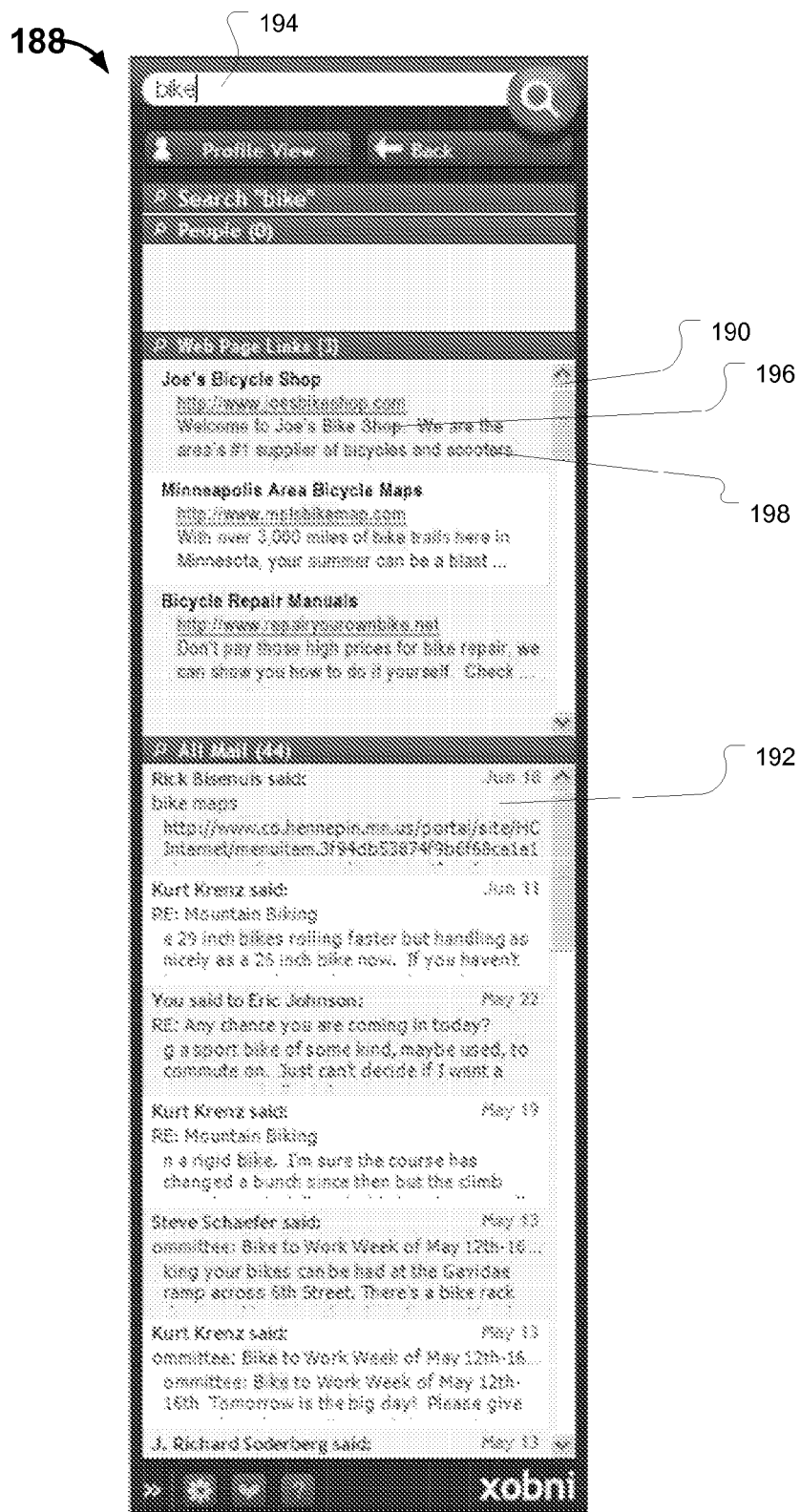
FIG. 1D shows an example of a search panel.

FIG. 1D shows a search panel 188 for a search titles "bike". The search panel 188 can display search results gathered from, for example, a communication profile such as the communication profile 130 of FIG. 1B. The search panel 188 can also display information about communications, communication attachments, files, web page links, or conversation threads. The communications can be gathered from search engine input, social network communications, e-mail, instant messages, text messages, content sharing communications and telephone communications to name a few examples. In some implementations, the search bar 188 can operate similarly to the search bar 134 in the profile 130 described earlier. In the example shown in FIG. 1D the search panel 188 displays conversation data. The conversation data illustrated in FIG. 1D includes a web page hyperlinks list 190 and an email message list 192.

In some implementations, the web page hyperlinks list 190 can include web page hyperlinks gathered from communications. The hyperlinks shown in the list can be indexed in a data structure that relates the hyperlink to the communication from which the hyperlink is gathered. In some implementations, the index can be stored in a database to improve the access response time to the hyperlink or other data stored in the database.

The example search bar 188 illustrates a search term 194, in this example, the text "bike". As illustrated in the search bar 188, the term "bike" reflects communications in the web page hyperlinks list 190 where hyperlink information is displayed. The web page hyperlinks list 190 can include highlighting 196 of content matching the term "bike". For example, web page content 198 gathered from the web page http://www.joesbikeshop is displayed just below the web page link http://www.joesbikeshop. The content 198 includes occurrences of the search term 194 where the occurrences are highlighted by the system 100. In some implementations, if a match is found for one or more of the link, the communication associated with the link, or the content associated with the link including in some implementations, a specific or selected portion of the content, the portion of the content can be displayed in the web page hyperlinks list 190 for the web page content 198.

Figure 2:
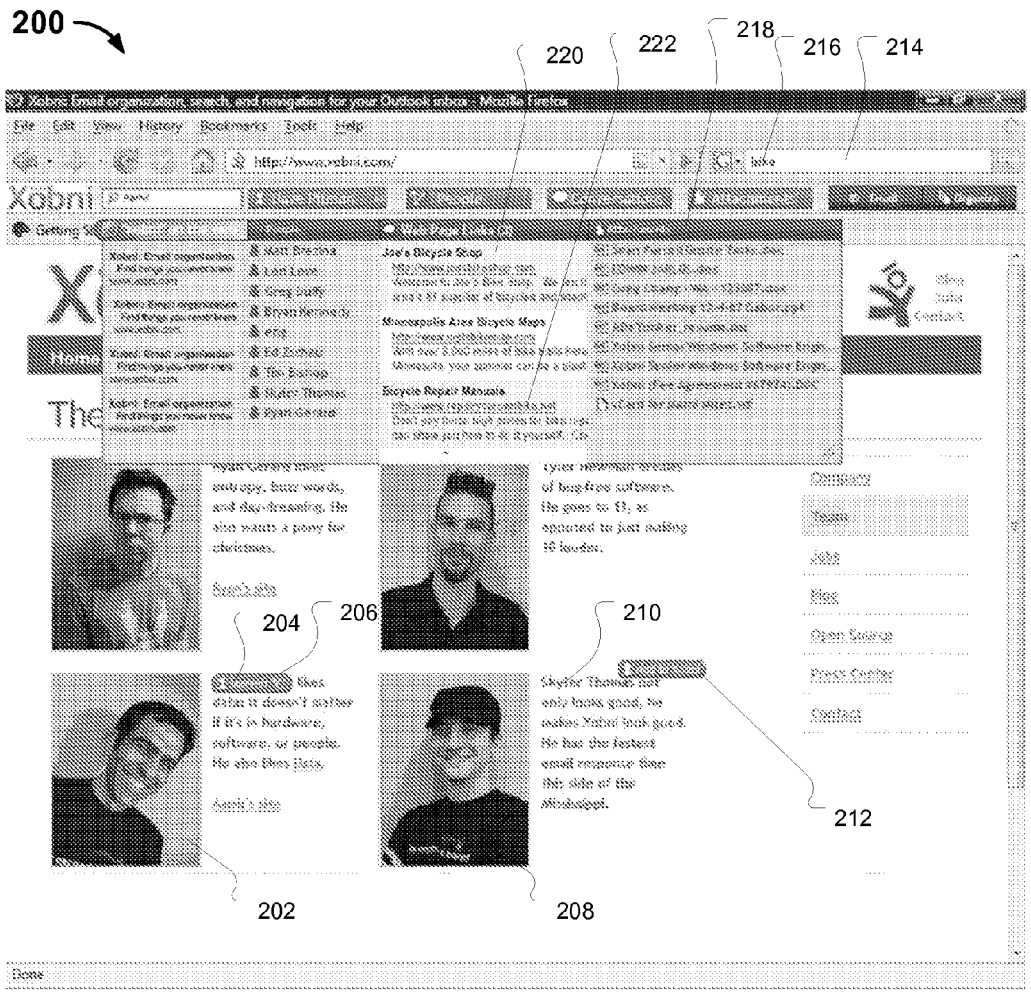
FIG. 2 shows an example of a webpage with inserted communication profile web page links.

FIG. 2 shows a webpage 200. The webpage 200 includes pictures and names for several people. The webpage 200 includes a picture 202 and a name 204 for a person named Aarmir V. A button 206 has been inserted onto the webpage 200 over Aarmir V's name 204. The button 206 may have been inserted onto the webpage 200 by a system similar to the system 100 from FIG. 1A. The system may have identified Aarmir V as a person that a user has exchanged communications with. In some implementations, the user may never have communicated with Aarmir V, but the system may have enough information to create a person profile for Aarmir V. The presence of the button 206 which includes Aarmir V's name can indicate that the system is capable of presenting a person profile for Aarmir V. The user can click on or select the button 206 to cause a person profile for Aarmir V to be presented. In some implementations, the button 206 can take the form of a hyperlink. In some implementations, the button 206 can take the form of highlighted text.

The webpage 200 further includes a picture 208 and a name 210 for a person named Skyler Thomas. A button 212 has been inserted near the name 210. The button 212 may have been inserted onto the webpage 200 by a system similar to the system 100 from FIG. 1A. The presence of the button 212 near the name 210 can indicate that the system does not currently have enough data to present a person profile for Skyler Thomas, but that the system is capable of collecting information from one or more sources in order to create a person profile for Skyler Thomas. The user can click on or select the button 212 to cause the system to collect information about Sklyer Thomas from one or more sources. In some implementations, selecting the button 212 can cause a person profile for Skyler Thomas to be generated and displayed once information about Skyler Thomas has been collected.

The webpage 200 further includes a search toolbar 214. In some implementations, the search toolbar 214 can be included as part of the webpage 200. In some implementations, the search toolbar 214 can be installed as a "plug-in" application to the internet web browser displaying the webpage 200. In some implementations, the search toolbar 214 can be a standalone application which directs its search results into or onto the webpage 200. Other implementations of the search toolbar 214 can also be implemented.

In the example webpage 200, the search toolbar 214 includes an entry field 216 for entering search terms. In some implementations, the field 216 can accept alphanumeric text entries. In this example, the text entry field 216 illustrates a search using the alphabetic search term "bike". Another method for searching can include selecting content within the webpage 200 and choosing from a popup context menu to perform a search on the selected content.

The webpage 200 further includes an overlay 218 for displaying information. In some implementations, the overlay 218 can appear automatically when a search is initiated. In some implementations, the overlay 218 can appear when requested specifically by a user viewing the webpage 200. In some implementations, the overlay 218 can include personal and conversation data. In some implementations, the overlay 218 can include other suggested information. For example, the overlay 218 may include hyperlinks to information relevant to the search term "bike". In another example, the overlay 218 can include randomly selected hyperlinks.

In some implementations, the overlay 218 can include an area to display a web page hyperlinks list 220. In some implementations, the web page hyperlinks list 220 can include items commonly displayed to describe a hyperlink, including a title, the hyperlink address, and a short description of the hyperlink's destination webpage. In some implementations, the web page hyperlinks list 220 can include highlighting 222 of each occurrence for the search term entered in the search field 216. The highlighting 222 can include markings placed within the example webpage 200. The search term "bike" is shown entered in the search toolbar 214, and the web page hyperlinks list 220 includes hyperlinks where the title, hyperlink, description, or some content included in the destination web page for the hyperlink were indexed as part of a conversation or person profile. The indexing of data included in the web page hyperlinks list is described previously and in more detail for FIG. 1D.

Figure 3:
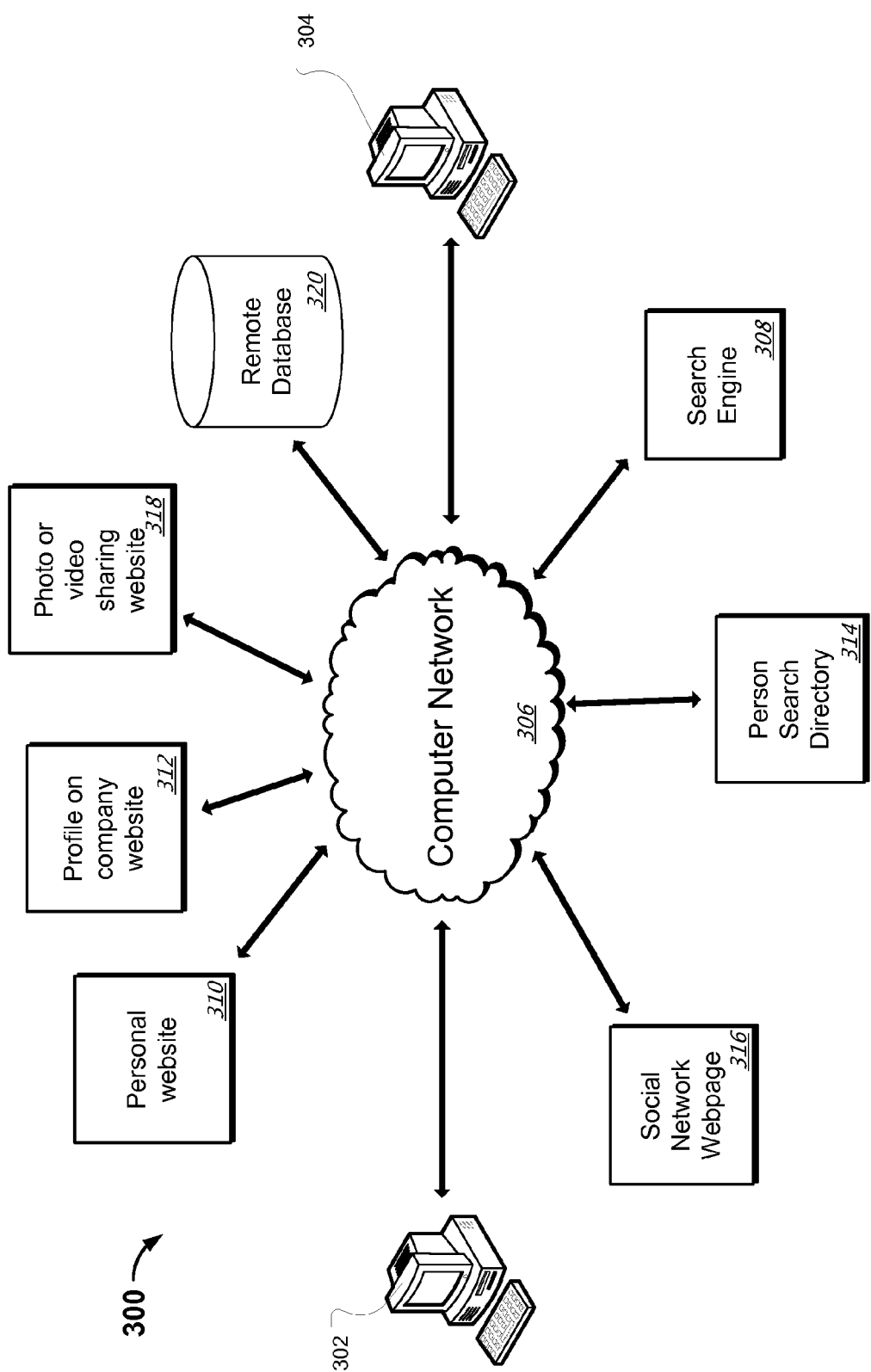
FIG. 3 is a block diagram of an example communication delivery system.

FIG. 3 shows an example communication delivery system 300. In the system 300, a first device (e.g., computer 302) belonging to a first user can transmit a communication to a second device (e.g., computer 304) belonging to a second user over a computer network 306. The computer network 306 can be the Internet, an intranet, a LAN system or a company's internal computer network. In some implementations, the computer 302 and the computer 304 can be desktop computers, laptop computers, cell phones, web enabled televisions, or personal digital assistants. The communication transmitted from the computer 302 to the computer 304 can be an e-mail, phone call, instant message, text message, social network message or comment, message board post, or voice over IP communication.

The computer 304 can extract data from the communication about the first user. This data can be used to make a person profile similar to the profile 130 shown in FIG. 1B. Data extracted from other communications with the first user can also be used to create a person profile for the first user. Data that is extracted from communications with the first user can be used to query websites, search engines, person search directories and other sources of information for additional information about the first user that can be used to create a person profile. Information from communications that can be used as search criteria include names, screen names, social network profile names, social network profile URLs, physical addresses, website URLs, e-mail addresses, or telephone numbers. Information that is collected as a result of these queries can be used in future searches to identify additional information that can be used to create a person profile.

For example, the computer 304 can receive an e-mail sent by the first user from the computer 302. The computer 304 can perform a search using a search engine 308 with the first user's e-mail address as the search criteria. The search engine 308 can return a search result that includes the first user's phone number. This phone number can be displayed as part of a person profile for the first user. The search engine 308 can also return the URL for or link to a personal website 310 belonging to the first user. The personal website 310 may contain additional information about the first user that can be used to create a person profile, such as additional contact information or biographical information.

In another example, the e-mail address belonging to the first user may include an extension for a company. The computer 304 can perform a search using the search engine 308 with the e-mail extension as the search criteria. A result returned by the search can be a company website. The company website can be searched to reveal a profile page 312 for the first user on the company website. The profile page 312 may contain additional information about the first user that can be used to create a person profile, such as additional contact information or biographical information.

In another example, the computer 304 can perform a search using a person search directory 314 with the first user's name or other contact information as the search criteria. The person search directory 314 can return search results with additional contact information and other information that can be used to create a person profile for the first user.

In another example, the computer 304 can receive an e-mail sent by the first user from the computer 302. The e-mail can contain a social network profile name for the first user. The computer 304 can extract this social network profile name from the e-mail and use it to access a social network webpage 316. The social network webpage 316 can contain additional contact information and other information that can be extracted and used to create a person profile for the first user. The social network webpage 316 can also contain additional contacts that can be associated with the first user in a person profile. For example, persons on the friends list of the social network webpage 316, or persons who have posted comments or messages on the social network webpage 316 can be listed as contacts in a contact network for the first user.

In another example, a search performed using the search engine 308 can return a URL or link for a photo or video sharing website 318 on which the first user has a profile.

Additional contact information or biographical information that can be extracted and used to create a person profile for the first user. For example, a profile belonging to the first user on a video sharing website may include an instant message screen name for the first user. This screen name can be extracted and displayed as part of a person profile for the first user.

In some implementations, the communication data, contact information, bibliographic information and other data collected by the computer 304 can be stored locally on a hard drive or other media storage device of the computer 304. In some implementations, the data collected by the computer 304 is stored in a location external to an e-mail client, instant message client, or other communication client used in making the communications. For example, a person profile for the first user can include information about e-mails exchanged between the first user and the second user, the person profile for the first user is stored in a memory location on the computer 304 that is separate from a memory location used by an e-mail client used to send and receive the e-mails exchanged between the first user and the second user. In another example, data related to the contents of communications in a conversation thread can be stored in a memory location on the computer 304 that is separate from a memory location used by an e-mail client that was used to send and receive the communications in the conversation thread.

In some implementations, the communication data, contact information, bibliographic information and other data collected by the computer 304 can be stored in a remote database 320 that is external to the computer 304. In some implementations, the computer 304 can connect to the remote database 320 via the computer network 306 as shown in FIG. 3. In some implementations, the computer 304 can connect to the remote database 320 directly or via a separate computer network. The data stored in the remote database 320 can be separate from data stored by an e-mail client, instant message client, or other communication client. For example, an e-mail client running on the computer 304 can store data locally on the computer 304 while data collected as part of a person profile, including communication data collected from the e-mail client, is stored in the remote database 320.

Information extracted from communications between the first user and second user can be used to update profile information on a social network webpage or other webpage. For example, the computer 304 can detect that the second user system has primarily used e-mail address "david@foo.com" in recent communications, while the second user's profile on the social network webpage 316 shows his email address as "david@bar.com". The computer 304 can share the second user's new e-mail address with the social network webpage 316 and the social network can automatically update the second user's info or suggest he update it based on this changed behavior recorded by the computer 304.

The computer 304 can monitor the behavior of the second user to determine if the second user has made an implicit request to view a person profile. For example, the second user can view the social network page 316 for the first user. The computer 304 can detect that the second user is viewing the social network page 316 associated with the first user and present a person profile for the first user. In another example, the second user can view a social network profile for a third person which can cause the computer 304 to present a person profile for the third person.

In another example, the second user can view the personal website 310 of the first user. The computer 304 can detect that the second user is viewing the personal website 310 associated with the first user and present a person profile for the first user. In another example, the second user can view the profile page 312 for the first user on the first user's company website. The computer 304 can detect that the second user is viewing the profile page 312 associated with the first user and present a person profile for the first user.

In another example, the second user can view a profile for the first user on the photo or video sharing website 318. The computer 304 can detect that the second user is viewing the profile associated with the first user on the photo or video sharing website 318 and present a person profile for the first user. In another example, the second user can view a photo of a third person on the photo or video sharing website 318. The computer 304 can detect that the second user is viewing a photo of the third person and present a person profile for the third person.

In another example, the second user can view a list of people in the person search directory 314. The second user can then select or indicated a person's name on the list of people. The computer 304 can detect that the second user has selected or indicated the person's name and present a person profile for the person.

Figure 4:
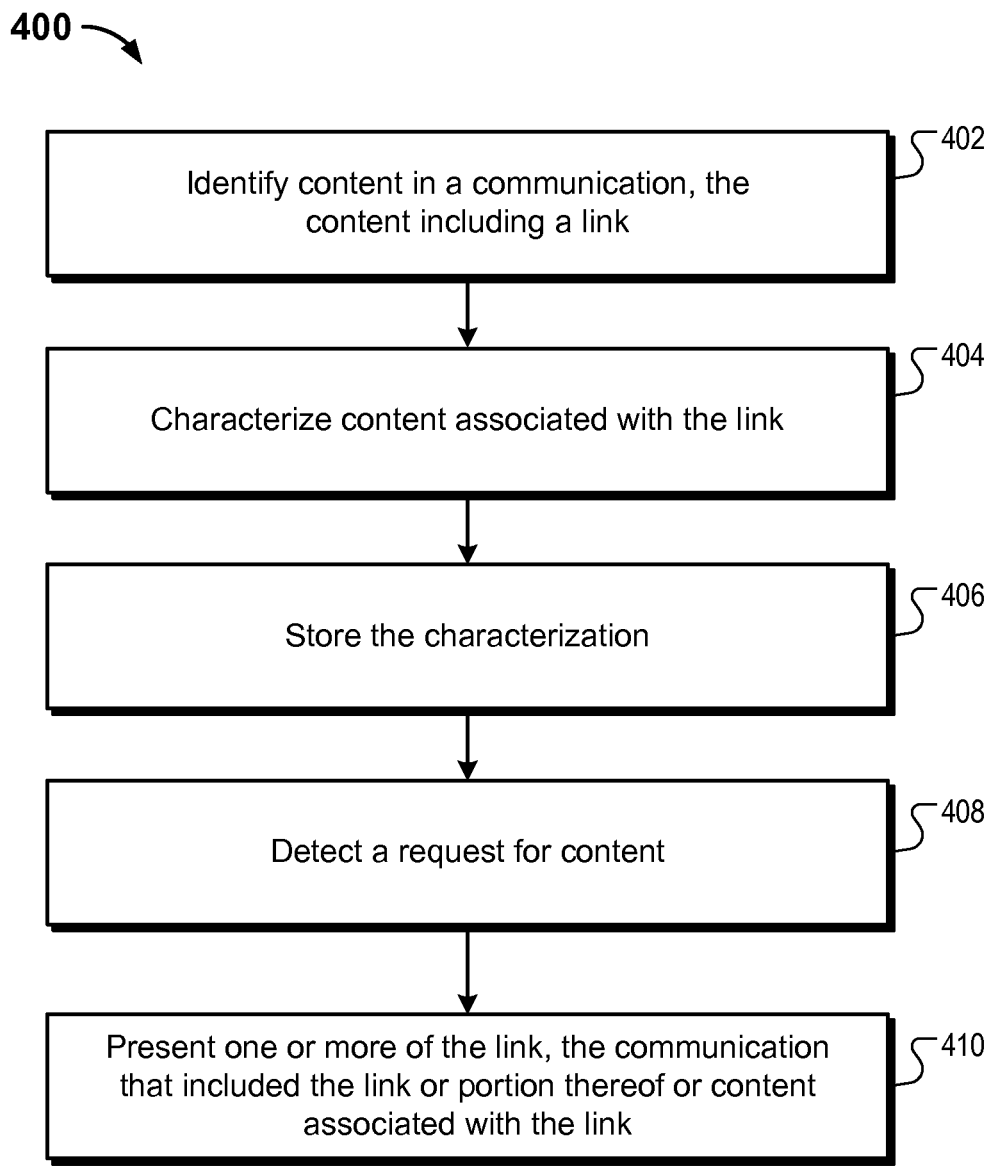
FIG. 4 is a flow diagram of an example process for organizing and retrieving information related to electronic communications.

FIG. 4 is a flow diagram of an example process 400 for organizing and retrieving information related to electronic communications. The process 400 can, for example, be implemented in a system such as the system 100 of FIG. 1A. In another example, the process 400 can be implemented in a system such as the communication delivery system 300 of FIG. 3.

Stage 402 identifies content in a communication, the content including a link. For example, content including links can be collected from communications such as e-mails, instant messages, phone calls, text messages, internet message board postings, social network messages or comments, or voice over IP communications can be collected.

In some implementations, identifying content that contains links can be accomplished by an application that searches for textual patterns common to links. For example, identifying links can include comparisons of content to a known list of link prefixes including "http://", "ftp://", "www.", ".com", ".net", or other types of web page link textual patterns.

Stage 404 characterizes content associated with the link. In some implementations, characterizing content associated with the link can include extracting keywords from the language of the link. For example, the link "http://www.fastcars.com" includes keywords that may be extracted such as "fast" and "cars". In some implementations, these keywords may later be used when searching for similar content or content associated with historical communications.

In some implementations, characterization may include characterizing the content of the communication to which the link was attached (i.e., the content associated with the link can include the original communication or any other related communication). For example, an email communication may include content that describes what the link refers to. For example, an email communication may include the text "Hello, please visit this link, it's all about cars, trucks, and motorcycles" followed by the link "http://www.fastcars.com". In this example, the text included in the email communication includes keywords such as "cars" and "trucks" can be included in the characterization of the link "http://www.fastcars.com".

In some implementations, characterizing content associated with the link can include extracting keywords from the name or title of the webpage that the link refers to. For example, the webpage "http://www.fastcars.com" can have a title embedded in the content of the webpage that can be accessed and parsed into separate keywords or phrases. These keywords or phrases may later be used when searching for similar content or content associated with historical communications.

In some implementations, characterizing content associated with the link can include extracting keywords from the content of a webpage, where the webpage has been referenced by a link within a communication. For example, an email communication may include a link to a webpage that one user might suggest another user visit. Identifying keywords can include traversing or scanning the contents of the webpage referenced by the link and extracting these keywords.

In some implementations, webpages may include embedded links to other webpages and webpages behind the embedded links may include embedded links to still other webpages. In this case, keywords can be identified within webpages one or many embedded levels from the original link. For example, a link included in an email communication may link to a webpage such as "http://www.fastcars.com:". The content of the webpage "www.fastcars.com" may include a list of other links to webpages related to cars such as links to tire companies, chrome accessory companies and lubricant companies. In this example, keywords may be extracted from not only the original "www.fastcars.com" webpage content, but also the content of the webpages of the tire companies, chrome accessory companies and lubricant companies.

In some implementations, characterizing content associated with a link can include describing a link by assigning a name or title to the link. For example, the link "http://www.marathonsandfitness.com" may be described with a single name or title such as "exercise". In some implementations, characterizing content associated with a link can include describing the link in terms of the keywords that a user might enter to search for the link. For example, a web link of "http://www.bicycles.com" may be described using a list of keywords such as "bicycle, bike, wheels, pedals". In some implementations, characterizing content associated with a link can include describing the link in terms of the keywords that relate to the content behind the link. For example, content behind a link can include the text, images, animations or other types of information included in a webpage. Additionally, the content behind a link can include a webpage that includes other embedded links. In some implementations, the system 400 may characterize content by following or accessing the information or content behind the links embedded in the web pages of other embedded links. In some implementations, the number of embedded links and the corresponding content behind those links that can be characterized may be configurable for the system 400.

In some implementations, the characterization can be updated to reflect new or changed content included in the web pages or embedded links. In one example, changes to the content of a web page may result in the need for the generation of additional keywords that can be included in a characterization. In some implementations, the system 400 may include a mechanism for performing regular updates to characterizations by indexing content of a link or accessing the information or content behind the link at set time intervals. In some implementations, updates to characterizations can happen whenever the link is seen again (received, typed, etc.).

Stage 406 stores the characterization. For example, a system implementing the method 400 can store the characterization in a searchable form to allow for the easy retrievability of information based on a user prompt (e.g., in response to a search request) or the like. In some implementations, storing the characterization can include indexing the content including the link that is identified at stage 402 and characterization at state 404. In some implementations, the index can relate the characterization, the link and the communication that included the link. In some implementations, the index can include a single word that is common to a link, a communication, and a characterization. For example, the word "car" may provide an index for accessing a webpage with a link of "www.cars-r-us.com", a communication such as an email including the link and a file attachment with a filename of "mynicecar.jpg" which characterizes the link.

In some implementations, the index can include the name of a category. For example, a category named "automobiles" can provide an index to any communications, links, and characterizations related to cars, trucks, vans and other types of automobiles.

In some implementations, the index can provide traceability of content including links back to its source. For example, indexing content can include a pointer to an identifier for an email message where the email message included the link. In this example, a conversation that included a link to a webpage can be traced from a reference to the link back to the original conversation.

Stage 408 detects a request for content. The request can be explicit or implicit. For example, a system implementing the method can track the mouse movements, keyboard strokes, or mouse clicks of a user of the system or active windows or mouse locations displayed on a monitor or other display device of the system. The user's behavior can be monitored to determine if the user has opened, viewed, read, composed, initiated or received a communication such as an email that relates to content that has been characterized. The user's behavior can also be monitored to determine if the user has performed a search, clicked on a particular item, or selected a particular item. Implicit requests to view the characterized information can include opening, viewing, reading, writing, initiating, or receiving an e-mail, performing a search or other communication. For example, the user can make an implicit request to view a link by typing a search in the search toolbar described previously for FIG. 1D.

Stage 410 presents one or more of the link, the communication or portion thereof that included the link or content associated with the link. In some implementations, the link can be presented along with other information, such as characterizing information. In some implementations, the link is presented along with, or part of, a communication profile. The communication profile displayed can be associated with the communications that include the link. For example, a system implementing the method 400 can display a communication profile for communications in response to the user making an implicit search request to view communications relevant to a search term. The example search panel 188 in FIG. 1D illustrates just one view of communications where the characterized content associated with the link matches a performed search.

Figure 5:
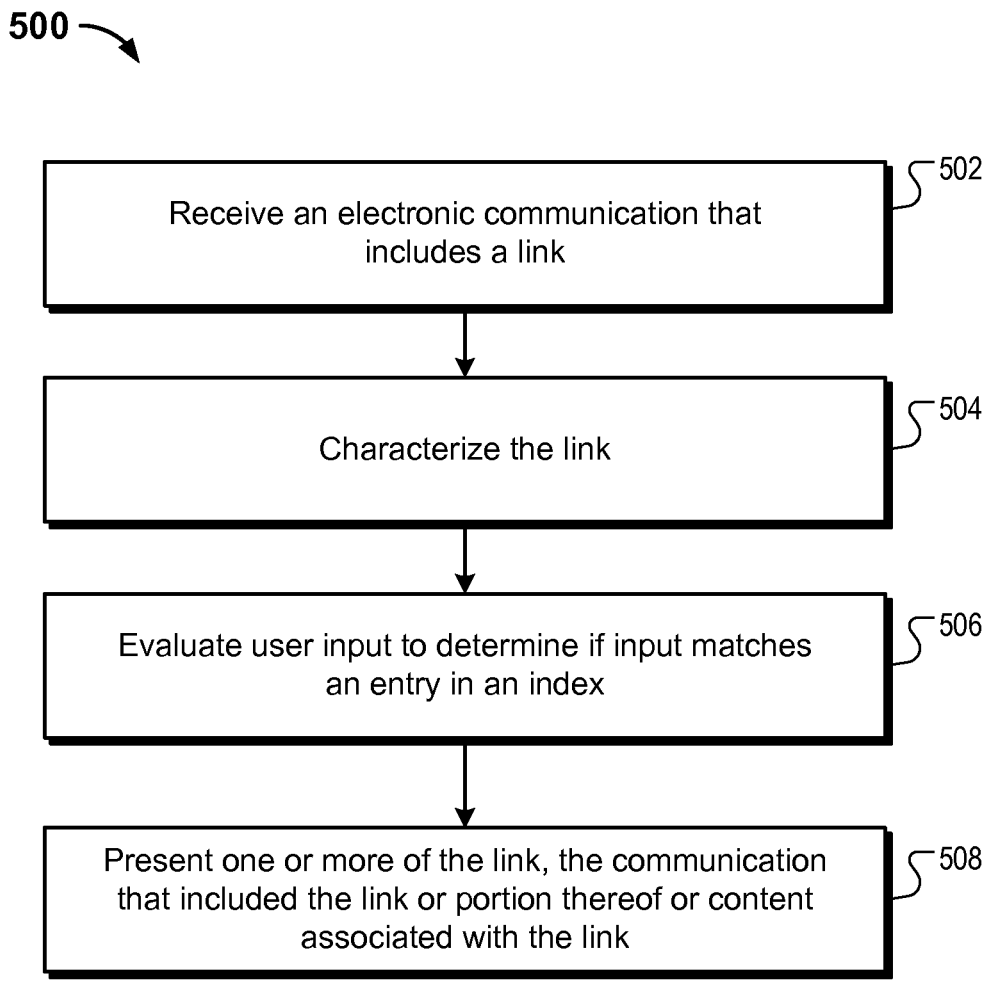
FIG. 5 is a flow diagram of an example process for characterizing content behind links presented in a communication.

FIG. 5 is a flow diagram of another example process 500 for characterizing and retrieving information related to links in an electronic communication. The process 500 can, for example, be implemented in a system such as the system 100 of FIG. 1A. In another example, the process 500 can be implemented in a system such as the communication delivery system 300 of FIG. 3.

Stage 502 receives an electronic communication that includes a link. In some implementations, the communication received can include an email message that includes a link. In other implementations, the communication received can include an text message sent through telephone, where the text message includes a link.

Stage 504 characterizes the link. In some implementations, characterizing the link can include extracting keywords from the language of the link address. For example, the link "http://www.fastcars.com" includes keywords that may be extracted such as "fast" and "cars". In some implementations, these keywords may later be used when searching for similar content or content associated with historical communications. Other characterizations are possible.

Stage 506 evaluates user input to determine if input matches an entry in an index. For example, a search performed using the search panel 118 depicted for FIG. 1D can be used to execute a text search for one or more keywords. In some implementations, the search can be executed on a repository of communication data (i.e., that includes the characterizations and links), such as the remote database 320 shown for FIG. 3.

An example of a user interface for entering user input is illustrated and described previously for FIG. 1D. In the example search panel 188, the search field 194 depicts the text "bike". In some implementations, the text "bike" can be evaluated against one or more indexes. The indexes can relate historical communications, links, and characterizations.

Stage 508 presents one or more of the link, the communication or portion thereof associated with the link or associated content. In some implementations, the communication including one or more links can be displayed in an overlay of webpage, where the links are displayed in a list of links, for example, the web page links list 220 portion of the overlay 218, depicted for FIG. 2. In some implementations, the communication including one or more links can be displayed as a list of links shown in a sidebar, for example, the sidebar 188 for FIG. 1D.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed:

1. A method, comprising:
creating, by a computer, a plurality of profiles including a first profile of a first sender, each profile for a respective sender of at least one of a plurality of communications, each profile including a plurality of web page links, and each of the web page links for the respective profile extracted from one of the plurality of communications of the respective sender, wherein each of the plurality of web page links points to a respective web page, a first communication of the plurality of communications includes a first link that points to a first web page, the first communication includes text that describes web page content of the first web page, the text includes at least one keyword, the at least one keyword is not included in the first link, and the first profile includes the first link;
extracting the at least one keyword from the first communication;
gathering the web page content from the first web page;
characterizing, by the computer, respective content associated with each of the plurality of web page links to provide characterization data, wherein the characterization data for the first link comprises the web page content and the at least one keyword; and
storing, in memory, the characterization data for use in responding to an access request.

2. The method of claim 1, wherein the characterizing further comprises extracting keywords associated with each respective web page.

3. The method of claim 1, wherein the access request is a search request of a user to whom the plurality of communications is addressed.

4. The method of claim 3, further comprising, in response to the search request, gathering search results comprising data from the first profile, and displaying the search results in a user interface of a computing device of the user, the search results comprising the plurality of web page links for the first profile.

5. The method of claim 4, further comprising, in response to the search request, displaying an email message list in the user interface.

6. The method of claim 1, wherein the plurality of communications comprises communications in a social network, and the first profile comprises data gathered from the social network.

7. The method of claim 1, further comprising in response to receiving the access request in a user interface of a computing device, displaying the web page content on a display of the computing device.

8. The method of claim 7, wherein the access request comprises a first keyword, and the web page content comprises the first keyword.

9. The method of claim 8, wherein the displaying the web page content comprises highlighting the first keyword on the display.

10. The method of claim 1, wherein the storing the characterization data comprises storing data in a database for responding to the access request, the stored data relating web page links to respective communications from which each respective web page link is gathered.

11. The method of claim 1, wherein the web page content is text that relates to the first link.

12. A system, comprising:
a display;
memory storing software instructions; and
a computer configured via the software instructions to:
create a plurality of profiles including a first profile of a first sender, each profile for a respective sender of at least one of a plurality of communications, each profile including a plurality of web page links, and each of the web page links for the respective profile extracted from one of the plurality of communications of the respective sender, wherein each of the plurality of web page links points to a respective web page, a first communication of the plurality of communications includes a first link that points to a first web page, the first communication includes text that describes content of the first web page, the text includes at least one keyword, the at least one keyword is not included in the first link, and the first profile includes the first link;

extract the at least one keyword from the first communication;

gather the content from the first web page;

characterize respective content associated with each of the plurality of web page links to provide characterization data, wherein the characterization data for the first link comprises the gathered content and the at least one keyword; and store the characterization data for use in responding to an access request provided via a user interface presented on the display.

13. The system of claim 12, further comprising a database, wherein the characterization data is accessed via the database when responding to the access request.

14. The system of claim 12, wherein the access request is a search request of a user to whom the plurality of communications is addressed.

15. The system of claim 12, wherein the computer is further configured via the software instructions to, in response to the access request, gather search results comprising data from the first profile, and present the search results on the display, the search results comprising at least one of the plurality of web page links.

16. The system of claim 12, wherein the computer is further configured via the software instructions to, in response to receiving the access request, display the web page content.

17. A non-transitory computer-readable storage medium storing computer-readable instructions, which when executed, cause a computing system to:

create, by a computer, a plurality of profiles including a first profile of a first sender, each profile for a respective sender of one of a plurality of communications, each profile including a plurality of web page links, and each of the web page links for the respective profile extracted from one of the plurality of communications of the respective sender, wherein each of the plurality of web page links points to a respective web page, a first communication of the plurality of communications includes a first link that points to a first web page, the first communication includes text that describes web page content of the first web page, the text includes at least one keyword, the at least one keyword is not included in the first link, and the first profile includes the first link;

extract the at least one keyword from the first communication;

gather the web page content from the first web page;

characterize, by the computer, respective content associated with each of the plurality of web page links to provide characterization data, wherein the characterization data for the first link comprises the web page content and the at least one keyword; and store the characterization data for use in responding to an access request.

18. The computer-readable storage medium of claim 17, wherein the characterizing further comprises extracting at least one keyword associated with each respective web page.

19. The computer-readable storage medium of claim 17, wherein the access request is a search request of a user to whom the plurality of communications is addressed.

* * * * *